(12) United States Patent  
Salapaka et al.

(10) Patent No.: US 7,313,948 B2
(45) Date of Patent: Jan. 1, 2008

(54) REAL TIME DETECTION OF LOSS OF CANTILEVER SENSING LOSS

(75) Inventors: Murti V. Salapaka, Ames, IA (US); Tathagata De, Ames, IA (US); Pranav Agarwal, Ames, IA (US); Deepak Ranjan Sahoo, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 26 days.

(21) Appl. No.: 11/419,616

(22) Filed: May 22, 2006

(65) Prior Publication Data

US 2006/0213261 A1 Sep. 28, 2006

Related U.S. Application Data

(63) Continuation-in-part of application No. 10/953,195, filed on Sep. 29, 2004, now Pat. No. 7,066,014.

(60) Provisional application No. 60/507,409, filed on Sep. 30, 2003.

(51) Int. Cl.
*G01B 5/28* (2006.01)
*G02B 6/26* (2006.01)

(52) U.S. Cl. ........................................................ 73/105

(58) Field of Classification Search .................... 73/105
See application file for complete search history.

(56) References Cited

U.S. PATENT DOCUMENTS

| 5,283,442 | A | * | 2/1994 | Martin et al. | ........... 250/559.22 |
| 6,845,190 | B1 | | 1/2005 | Smithwick et al. | |
| 7,066,014 | B2 | * | 6/2006 | Salapaka et al. | ............... 73/105 |

OTHER PUBLICATIONS

Greg Welch and Gary Bishop; An Introduction to the Kalman Filter; Paper; Updated Mar. 11, 2002; 16 pgs.
Martin Stark, Robert W. Stark, Wolfgang M. Heckl and Reinhard Guckenberger; inverting dynamic force microscopy: From signals to time-resolved interaction forces; Paper—PNAS, Jun. 25, 2002; pp. 8473-8478; vol. 99, No. 13.
Woo Chun Choi and Nam Woong Kim; Experimental study on active vibration control of a flexible cantilever using an artificial neural-network state predictor; Paper; 1996; pp. 751-758; IOP Publishing Ltd.

* cited by examiner

*Primary Examiner*—Michael Cygan
(74) *Attorney, Agent, or Firm*—Reinhart Boerner Van Deuren P.C.

(57) ABSTRACT

An approach to detect when a cantilever loses interaction with a sample, thereby detecting when a portion of an image obtained using a cantilever is spurious is presented. An observer based estimation of cantilever deflection is compared to the cantilever deflection and the resulting innovation is used to detect when the cantilever loses interaction. The loss of interaction is determined when the innovation is outside of and/or below a threshold level.

19 Claims, 30 Drawing Sheets

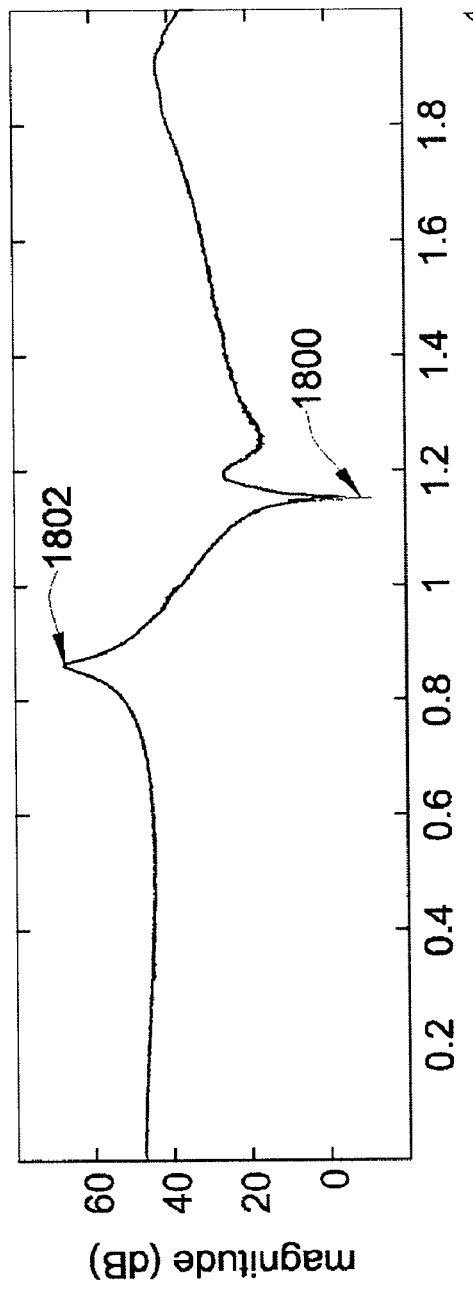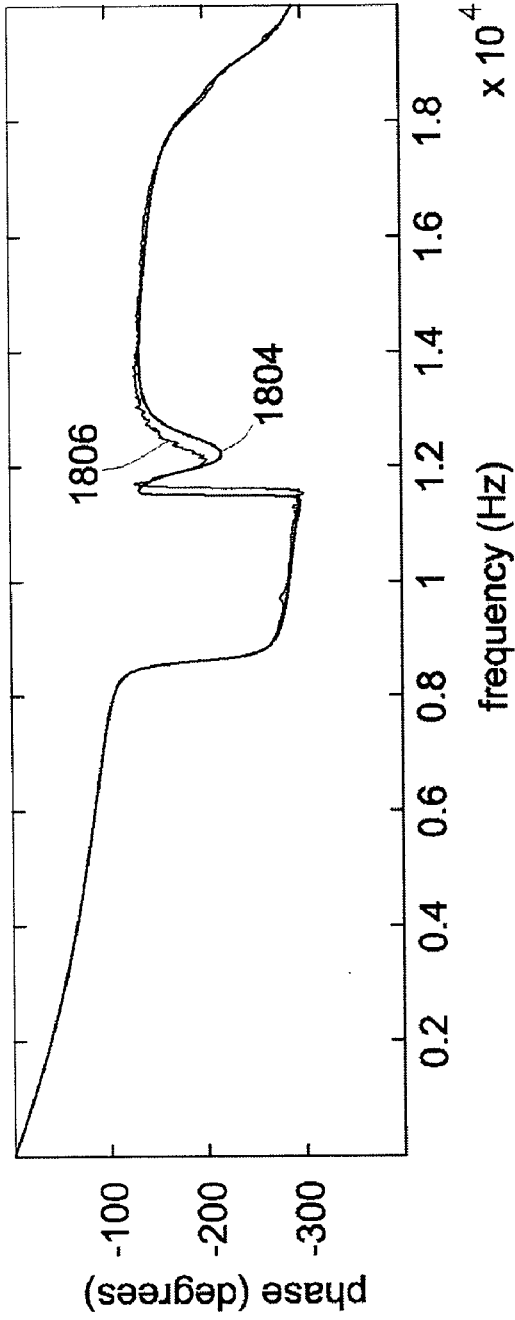
FIG. 18a
FIG. 18b

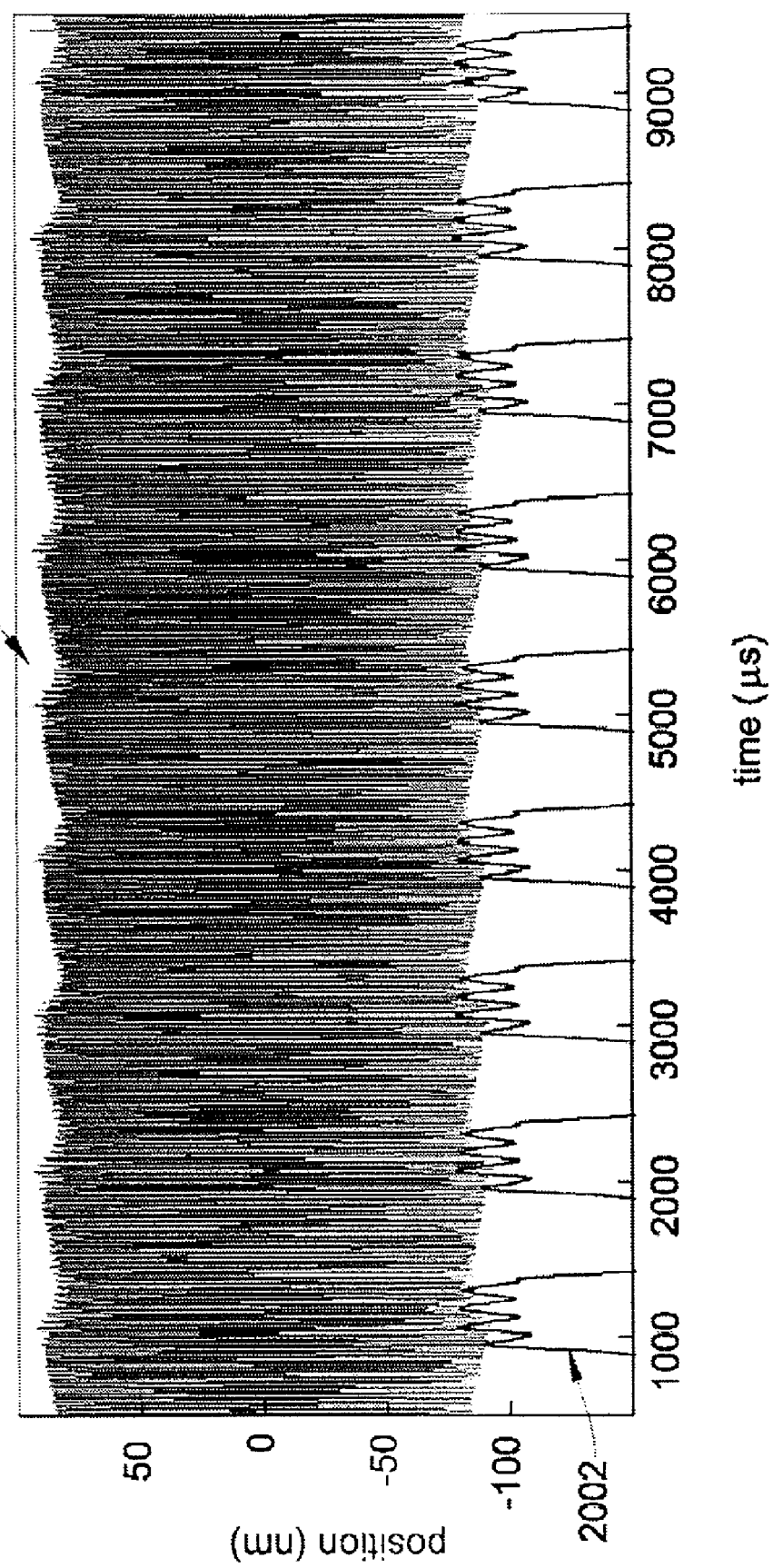

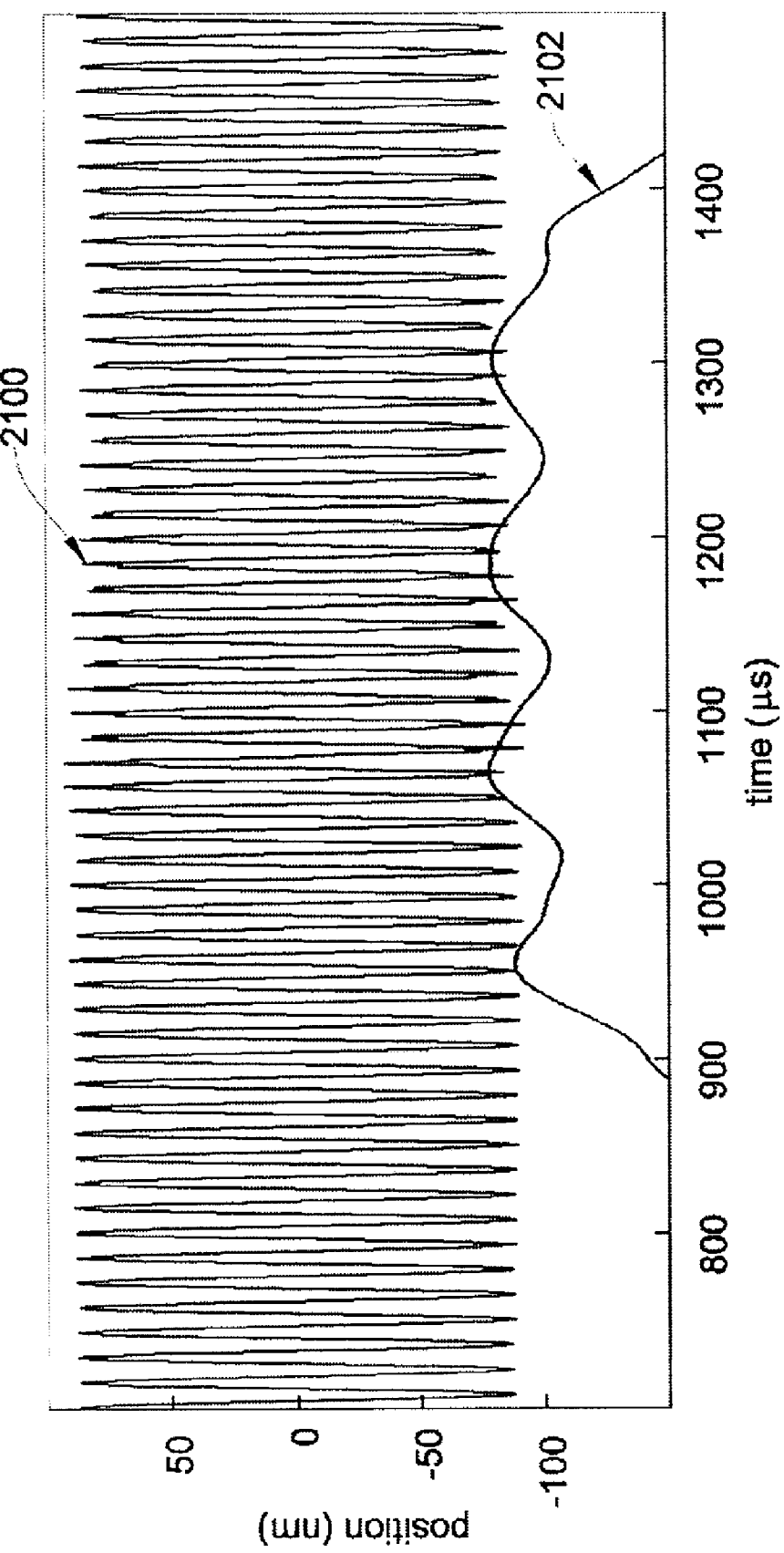

REAL TIME DETECTION OF LOSS OF CANTILEVER SENSING LOSS

CROSS-REFERENCE TO RELATED PATENT APPLICATIONS

This patent application is a continuation-in-part of U.S. patent application Ser. No. 10/953,195, filed Sep. 29, 2004 now U.S. Pat. No. 7,066,014, which claims the benefit of U.S. Provisional Patent Application No. 60/507,409, filed Sep. 30, 2003, the entire disclosures which are incorporated by reference in their entirety herein.

STATEMENT REGARDING FEDERALLY SPONSORED RESEARCH AND DEVELOPMENT

This invention was made in part with Government support under Grant Number ECS-0330224 awarded by the National Science Foundation. The Government may have certain rights in this invention.

FIELD OF THE INVENTION

This invention pertains to surface image measurements and more particularly relates to imaging of surfaces using microcantilevers that are the main probes in atomic force microscopes.

BACKGROUND OF THE INVENTION

Imaging and detection of structure surfaces using cantilevers have been in use for decades. For example, one prevalent use of cantilevers is in Scanned-proximity Probe Microscopes (SPM's) are instruments that have been in use in universities and industrial research laboratories since the early 1980's. These instruments allow for various imaging of surfaces as well as measurement of the intermolecular forces between two surfaces (or a small tip and a flat surface) in vapors or liquids with a distance resolution of 1 Å. This means that images and forces can be obtained at the atomic level. Over the years, the technique has been improved and its scope extended so that it is now capable of measuring many different surface properties and phenomena.

One type of SPM is an atomic force microscope (AFM), which generally consists of a sample surface and a probe that is supported at the end of a force-measuring cantilever spring. The AFM measures a local property such as height, optical absorption, or magnetism, with a probe or "tip" placed very close to a sample. It operates by first positioning the tip near the surface and then moving the tip laterally (scanning mode) while measuring the force produced on the tip by the surface. The force is calculated by measuring the deflection of the cantilever spring supporting the tip.

The most common method of measuring deflection of the cantilever is the optical or beam deflection method where vertical deflection can generally be measured with picometer resolution. The method works by reflecting a laser beam off end of the cantilever. Angular deflection of the cantilever causes a twofold larger angular deflection of the laser beam. The reflected beam strikes a split photodiode (i.e., two side-by-side photodiodes) and the difference between the two photodiode signals indicates the position of the laser beam on the split photodiode and thus the angular deflection of the cantilever.

FIGS. 29*a* and *b* illustrate a typical setup of a cantilever in an AFM application. The laser 1000 outputs a laser beam 1002 that is pointed at the cantilever 1004. A piezoelectric scanner 1006 is used to position the sample. The laser beam 1002 deflects off the cantilever 1004 and is reflected into the split photo-diode 1008 via mirror 1010. The output of the split photo-diode is conditioned via module 1012 and is input into feedback control module 1014 that is used to control the position of the sample movement of piezoelectric scanner 1006. In static force spectroscopy the cantilever deflection is solely due to the cantilever-sample inter-action. The piezoelectric scanner 1006 is rastered in the lateral directions and the deflection of the cantilever is used to interpret sample properties. In the dynamic mode, the cantilever support 1016 is forced sinusoidally using a dither piezo 1018. The changes in the oscillations caused by the sample are interpreted to obtain its properties.

The cantilever has low stiffness and high resonant frequency that allows it to probe inter-atomic forces. Microcantilevers, which are cantilevers having lengths typically ranging from 100 to 200 μm with tips of 5 nm, have been utilized in biological sciences to perform feats such as cutting DNA strands and monitoring RNA activity. Another application of the micro-cantilever is in the detection of single electron spin that has significant ramifications for quantum computing technology.

In spite of the underlying promise, considerable challenges remain. Pivotal to harnessing the vast potential of micro-cantilever based technology is ultra-fast interrogation capabilities. This is apparent as the manipulation, interrogation and control of atoms or spins of electrons needs to be accomplished for material that has macroscopic dimensions. To achieve high throughput, fast interrogation is imperative. It is becoming increasingly evident that for many nanotechnological studies, high bandwidth is a necessity. For example, in the field of cell biology, proposals on using nanotechnology have been presented where nano-probes track events in the cell. These events often have time-scales in the micro-second or nano-second regimes. Current measurement techniques do not meet the aforementioned high precision and bandwidth requirements. For example, the micro-cantilever is often operated in the dynamic mode where it is forced sinusoidally by a dither-piezo. This mode of operation has advantages of better signal to noise ratio and being gentle on the sample. Most dynamic imaging methods employing micro-cantilevers currently use variables such as the amplitude and phase, or the equivalent frequency of the micro-cantilever to infer sample characteristics. These are steady state characteristics and do not hold much significance during the transient of the cantilever oscillation. The present methods are therefore inherently slow owing to the large settling times of the cantilever oscillations.

Additionally, when the cantilever interacts with the sample, the cantilever-sample interaction force changes the deflection of cantilever and effects of the sample are gleaned from the cantilever deflection signal. For example, in one method of operation called amplitude modulated AFM (AM-AFM) operation, the amplitude of the first harmonic component of the cantilever oscillation is regulated at a desired set point by maintaining a constant cantilever-sample separation. Control of the cantilever-sample separation is accomplished by a piezo-actuated system that either moves the head that holds the cantilever or the stage that holds the sample. The vertical piezo actuation signal that regulates cantilever-sample separation is interpreted as the image of the sample. This mode is known as tapping mode (TM) or the intermittent contact (IC) mode. In a method called error signal mode (ESM) imaging, the feedback loop serves as a high-pass filter that compensates for the low frequency components like the slope of the sample, leaving only the high spatial frequency components of the surface to contribute to the error signal. The error signal that forms the image is the difference between the cantilever amplitude and the setpoint amplitude. In the ESM imaging mode, the feedback is essentially ineffective and the amplitude is used as the imaging parameter. A fundamental drawback that is common to these and other deflection based imaging schemes is that when the cantilever loses its interaction with the sample, it is not possible to glean any information about the sample from the cantilever deflection. The signals like the error signal in the ESM-AFM mode and the vertical actuation signal in the intermittent AM-AFM mode can exhibit identical behavior when interacting with the sample and when not interacting with the sample. This leads to erroneous interpretation of images and data, where a loss of interaction is often interpreted as a manifestation of a sample feature.

BRIEF SUMMARY OF THE INVENTION

The invention provides a method to detect when a cantilever loses interaction with a sample, thereby detecting when a portion of an image obtained using a cantilever is spurious is presented. An observer based estimation of cantilever deflection is compared to the cantilever deflection and the resulting innovation is used to detect when the cantilever loses interaction. The loss of interaction is determined when the innovation is outside of a threshold level or in an alternate embodiment, is below a threshold level.

These and other advantages of the invention, as well as additional inventive features, will become more apparent from the following detailed description when taken in conjunction with the accompanying drawings.

BRIEF DESCRIPTION OF THE DRAWINGS

FIGS. 18a and 18b are graphs illustrating the model response and the piezo response of an atomic force microscope in accordance with the invention;

FIGS. 20a and 20b are graphs illustrating the cantilever position and innovation process in response to a pulse shape generated using the piezo dynamics;

FIGS. 21a and 21b are graphs illustrating the innovation response for a piezo oscillation;

DETAILED DESCRIPTION OF THE INVENTION

The invention provides a method to utilize the transient behavior of the cantilever oscillations for sample imaging and detection. The transient based methods of the invention improve performance of interrogation speeds by approximately two orders of magnitude over steady state based methods. Fundamental limitations due to high quality factors are removed using the transient part of the cantilever motion. A model of the cantilever is used to build an observer that is used to estimate the state of the cantilever dynamics. The cantilever-sample interaction is modeled and corresponding data during the transient state of the probe is analyzed using generalized likelihood ratio test to detect and probe the sample profile. The use of the transient data results in sample detection at least ten times faster than using the steady state data based methods. In the description that follows, an AFM shall be used to describe the invention. While an AFM shall be used, the invention may be used in other sensing applications where a cantilever is used to detect and/or scan a surface of a sample. For example, the techniques and methods described herein may be used in detecting features in systems, detecting structural problems in structures, detecting events such as when a sample is changing, etc.

Figure 1:
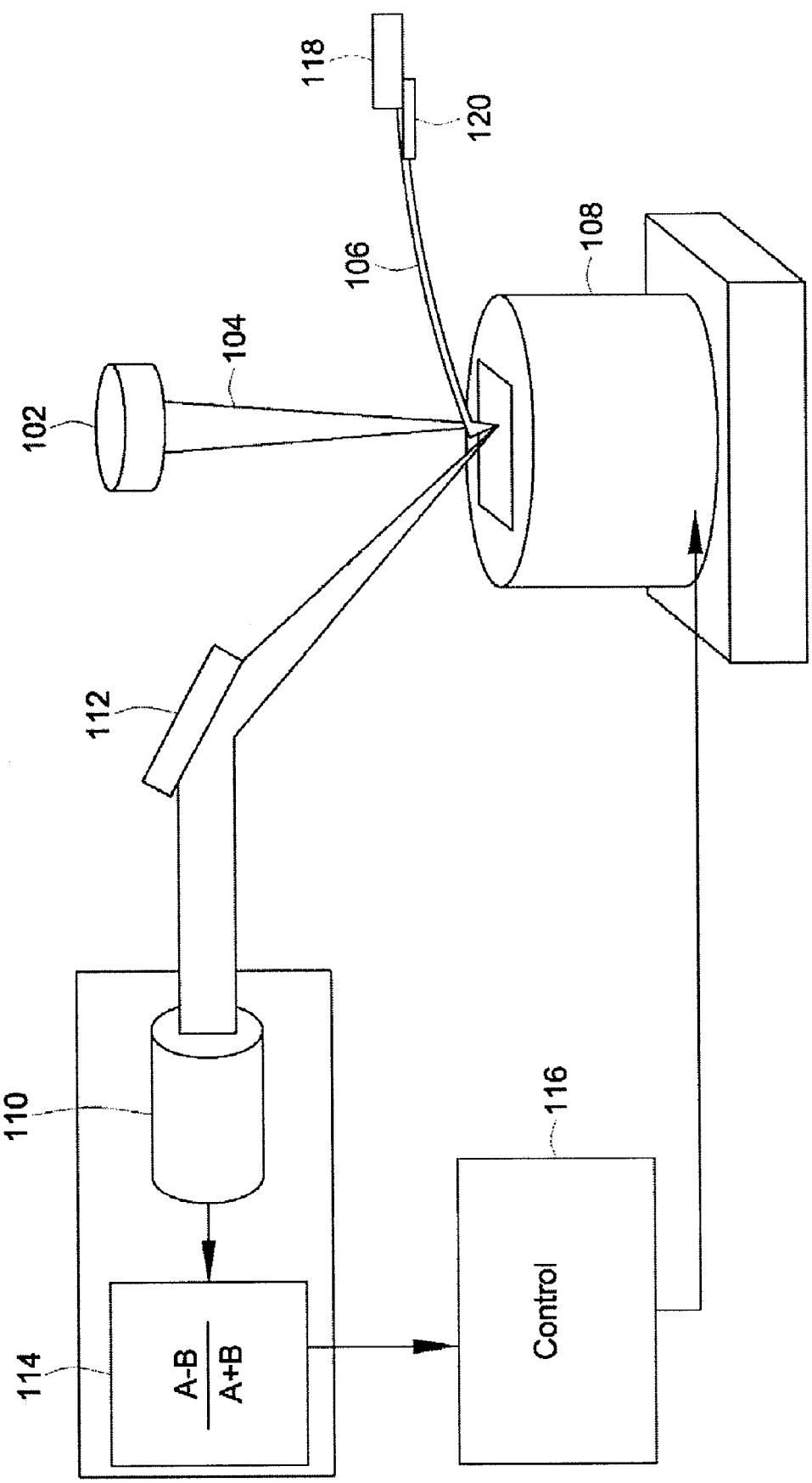
FIG. 1 is a block diagram generally illustrating an exemplary atomic force microscope environment on which the present invention may reside.

Turning to the drawings, wherein like reference numerals refer to like elements, the invention is illustrated as being implemented in a suitable environment. FIG. 1 illustrates an AFM 100. The laser 102 outputs a laser beam 104 that is pointed at the cantilever 106. The laser beam 104 deflects off the cantilever 106 and is reflected into the split photo-diode 110 via mirror 112. The output of the split photo-diode is conditioned via module 114 and is input into a control module 116 that is used to control the position of the sample relative to the cantilever 106. In one embodiment, the relative position of the structure being sampled is controlled by a positioning device 108. Alternatively, the cantilever position may be controlled in relation to the structure being sampled. In an AFM, a piezoelectric scanner 108 is used to position the sample. The piezoelectric scanner 108 is rastered in the lateral directions and the deflection of the cantilever is used to interpret sample properties. In the dynamic mode, the dither piezo 118 is used to force the cantilever support 120 to move sinusoidally. The changes in the oscillations caused by the sample are interpreted to obtain its properties.

Figure 2:
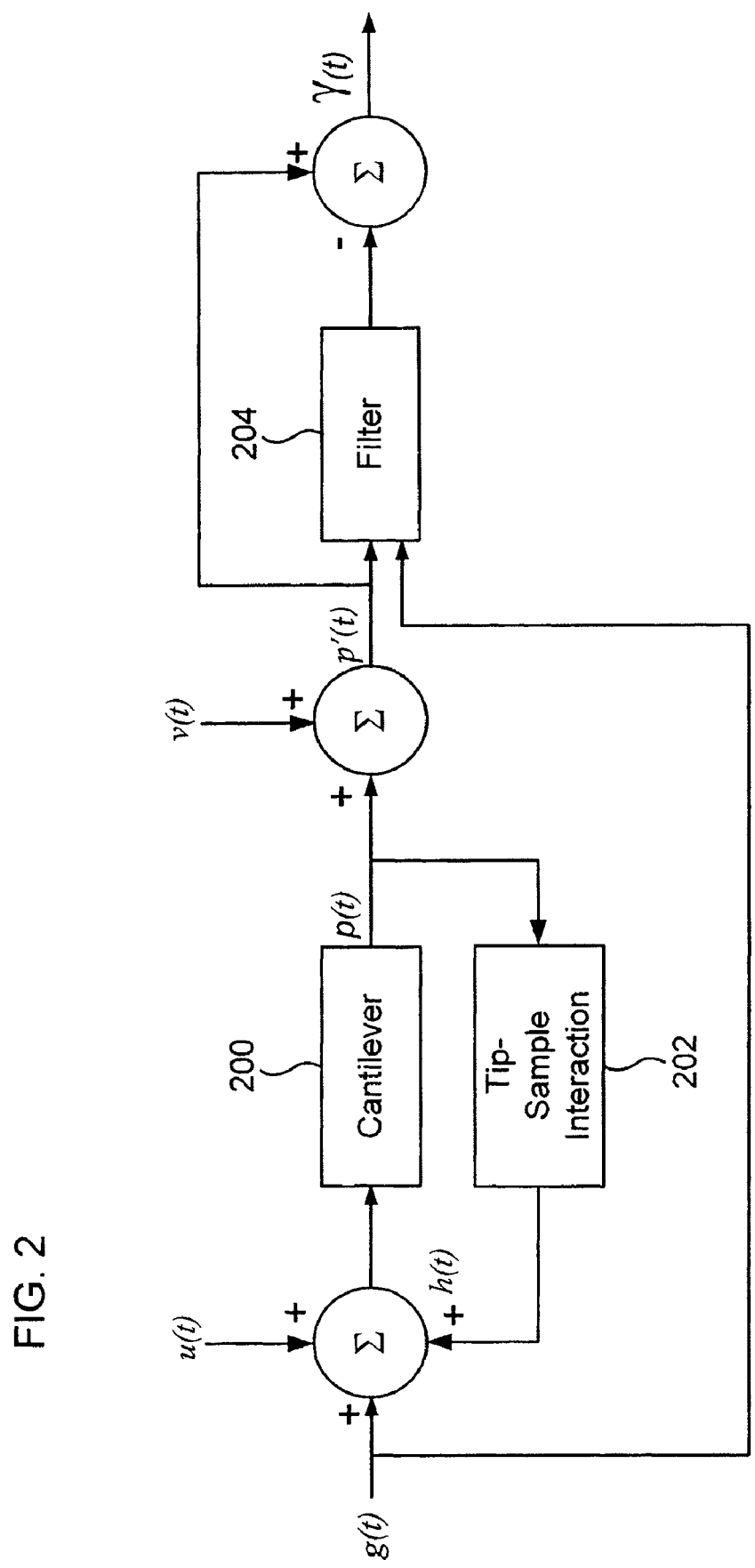
FIG. 2 is a block diagram generally illustrating the control blocks of the present invention.
Figure 3:
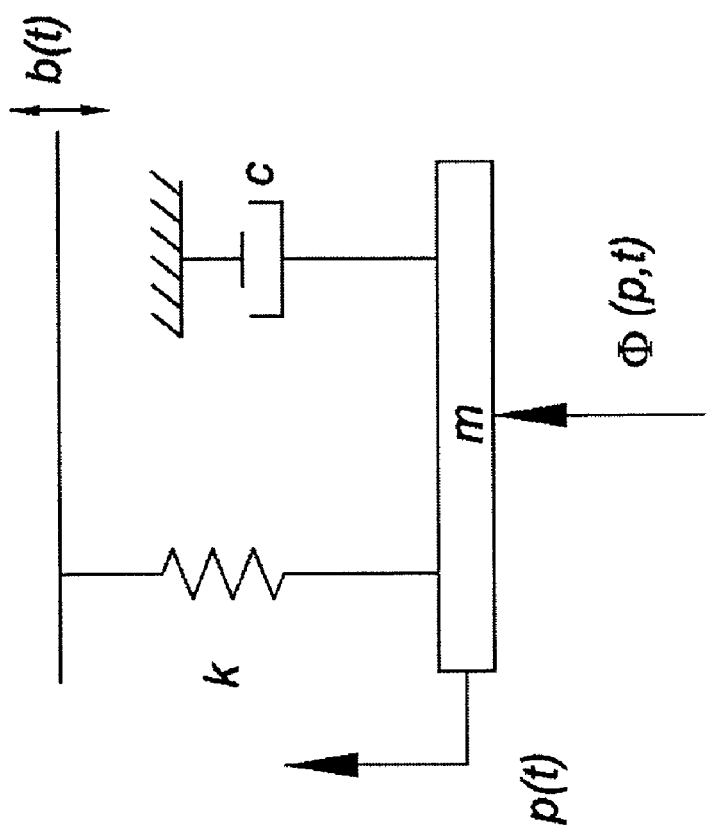
FIG. 3 is a block diagram of a spring-damper-mass model of cantilever dynamics.

Turning now to FIG. 2, a block diagram of the system model that the control module 116 implements is shown. The cantilever module 200 is the model of the cantilever. The cantilever module 200 has inputs g(t) and u(t) where g(t) is the external forcing on the cantilever and u(t) is the thermal noise. The model of the cantilever when it is forced sinusoidally at its first resonant is accurately described by $$\ddot{p} + 2\xi\omega_0\dot{p} + \omega_0^2 p = g(t) \tag{1}$$

where p(t), g(t), $\omega_0$ and $\xi$ denote the micro-cantilever deflection as measured by the photo-diode 110, the external forcing on the cantilever, the first resonant frequency of the cantilever and the damping factor in free medium respectively. This model can be viewed as a spring mass damper system as illustrated in FIG. 3. Turning briefly to FIG. 3, the spring-damper-mass model depicts the cantilever dynamics oscillating freely ($\Phi$=0) at its resonance frequency as described by Equation (1) with $$\omega_0 = \sqrt{\frac{k}{m}}, \ 2\xi\omega_0 = \frac{c}{m}, \text{ and } g(t) = \frac{k}{m}b(t) \tag{2}$$

where k is the spring constant, c is the damping constant, m is the mass, and b(t) is the sinusoidal forcing due to the dither piezo.

Note that $$\xi = \frac{1}{2Q}$$

with Q being the quality factor of the micro-cantilever. The parameters of the cantilever model can be accurately obtained by thermal noise analysis. From Equation 1, the continuous time state-space model of the micro-cantilever dynamics can be described as, $$\begin{pmatrix} \dot{x}_1 \\ \dot{x}_2 \end{pmatrix} = \begin{pmatrix} 0 & 1 \\ -\omega_0^2 & -2\xi\omega_0 \end{pmatrix} \begin{pmatrix} x_1 \\ x_2 \end{pmatrix} + \begin{pmatrix} 0 \\ 1 \end{pmatrix}(u + f_s) \tag{3}$$

$$y = (1 \ 0)\begin{pmatrix} x_1 \\ x_2 \end{pmatrix} + \upsilon$$

where state $x_1$ denotes the cantilever position p(t), state $x_2$ denotes the cantilever velocity $\dot{p}(t)$, and $\upsilon$ denotes the noise affecting the photodiode sensor. u=$n_{th}$+g(t) represents the combined effect of the thermal noise $n_{th}$, and the sinusoidal forcing b(t) due the dither piezo. The function $f_s$, which in terms of FIG. 3 is $f_s$=k/m$\Phi$, represents the equivalent force on the cantilever due to cantilever-sample interaction. The discretized version of the above model when the sample is not present can be denoted by $$x_{i+1} = Fx_i + Gu_i \tag{4}$$
$$y_i = Hx_i + v_i, \ i \geq 0$$

where $$E\left\{ \begin{bmatrix} u_i \\ v_i \\ x_i \end{bmatrix} \begin{bmatrix} u_j \\ v_j \\ x_0 \\ 1 \end{bmatrix}^T \right\} = \begin{bmatrix} Q_i\delta_{ij} & 0 & 0 & 0 \\ 0 & R_i\delta_{ij} & 0 & 0 \\ 0 & 0 & \Pi_0 & 0 \end{bmatrix} \tag{5}$$

It is assumed that the input noise and the noise in the output are uncorrelated. Note that when the sample is not present, the cantilever settles into a sinusoidal trajectory buried in noise.

Figure 4:
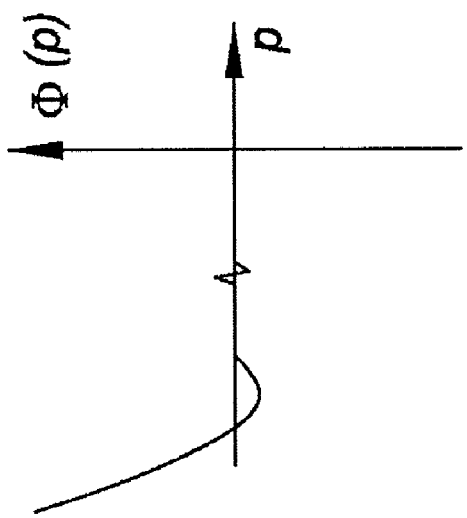
FIG. 4 is a plot illustrating the effect of cantilever-sample interaction on the cantilever.

When a sample is present, there is an attractive or repulsive force on the cantilever depending on the regime of interaction. Typically this cantilever-sample interaction is characterized by short range repulsive forces and long range attractive forces as shown in FIG. 4.

In many applications when the sample is introduced after the cantilever has settled into a sinusoidal orbit, the effect of the cantilever-sample interaction force of block 202 is modeled as an impulsive force. Intuitively this also follows because the time spent by the cantilever under the sample's influence is negligible compared to the time it spends outside the sample's influence. This assumption is particularly true for samples that have a small attractive regimes. Under such an assumption the cantilever dynamics is described by $$x_{i+1} = Fx_i + Gu_i + \delta_{\theta, i+1} v$$

$$y_i = Hx_i + v_i, \quad i \geq 0 \quad (6)$$

where $\theta$ denotes the time instant when the impact occurs, $\delta_{i,j}$ denotes the dirac delta function, and $v$ signifies the magnitude of the impact. Essentially, the impact causes an instantaneous change in the state by $v$ at time instant $\theta$. In this setting, the time of impact and the resulting change in the state are unknown quantities. The instant specification determines when the cantilever is "hitting" the sample and when it is not, that is to detect whether the change in state is occurring or not.

In order to detect whether the change in state is occurring, an observer based state estimation techniques and related tools are used. Note that in the AFM setup, the position of the cantilever (deflection signal from the photo-diode sensors) is measurable, not the velocity. Returning to FIG. 2, cantilever 200 is the linear time invariant system depicting the model of the cantilever. The interaction with the sample is modeled and shown as a non-linear cantilever-sample interaction system 202 appearing in the feedback path. The observer 204 is designed based on the thermal noise and measurement noise characteristics and experimentally determined values of the parameters of the model as given in equation 3.

The filter 204 estimates the state of the cantilever by observing the known input signal (e.g., sinusoidal forcing from the dither piezo) and available output signal (e.g., cantilever deflection data from photo diode sensor). When the sample is present as given by the model in equation 6, the estimated and filtered states from the filter 204 are given by, $$\hat{x}_{i+1|i} = F\hat{x}_{i|i},$$

$$\hat{x}_{i|i} = \hat{x}_{i|i-1} + K_i \gamma_i \quad (7)$$

with the measurement residual $\gamma_i$, filter gain $K_i$ and error covariance matrices given by $\gamma_i = y_i - H\hat{x}_{i|i-1}$, $K_i = P_{i|i-1}H^T V_i^{-1}$, $P_{i+1|i} = FP_{i|i}F^T + GQG^T$, $P_{i|i} = P_{i|i-1} - K_i HP_{i|i-1}$, $V_i = HP_{i|i-1}H^T + R$ . . . In the steady state the filter gain and the error covariance matrices become constant matrices as $K = \lim_{i \to \infty} K_i$, $P = \lim_{i \to \infty} P_{i|i-1}$ and $V = \lim_{i \to \infty} V_i = HPH^T + R$. For convenience of implementation, steady state filter parameters are used.

The measurement residual $\gamma_i$ is given by, $$\gamma_i = Y_{i;\theta}v + \gamma_i^1 \quad (8)$$

where $Y_{i;\theta}$ is a known dynamic signal profile with unknown magnitude $v$ defined by the following recursive formulae, $$Y_{i;\theta} = H[\Phi(i, \theta) - FX(i-1; \theta)],$$

$$X(i; \theta) = K_i Y_{i;\theta} + FX(i-1; \theta), \quad (9)$$

with $\Phi(i, \theta) = \Pi_{j=\theta}^i F$ and $X(i;i) = K_i H$. Here $Y_{i;\theta}$ and $X(i;\theta)$ are the additive parts in the innovation and the state estimate respectively. It can be shown that $\{\gamma_i^1\}$ is a zero mean white noise sequence with covariance $V_i$ and is the measurement residual had the jump not occurred.

Note that the damping present in a typical cantilever is very low with quality factor as high as 100 or above. This results in the cantilever taking considerable time to settle to the steady state periodic orbit. Whenever there is an impulsive input to the cantilever (possibly due to interaction with sample), the state changes to a new value. Since this input is not applied to the observer 204, the estimated state does not change instantly. This change is fed to the observer through the output data. The observer takes noticeable time to correct the estimates and track the output again. This gives rise to transients in the estimation error. Note that the observer is capable of tracking the transient response of the cantilever much before the system settles to the steady state periodic orbit by appropriately choosing the gain $K_i$. However, at the starting of the transients, there is a mismatch between the actual output and the estimated output. This results in the dynamic profile $Y_{i;\theta}$. This observation motivated us to develop a faster detection technique. Present detection schemes use the steady state deflection data, whereas the approach described herein uses the residual in innovation to probe the sample.

We pose the detection problem in the hypothesis testing framework as following.

$$H_0: Y_i = \gamma_i^1, \quad i=1,2,\ldots,n$$

versus $$H_1: Y_i = Y_{i;\theta}v + \gamma_i^1, \quad i=1,2,\ldots,n \quad (10)$$

where $\gamma_i^1$ is a zero mean white gaussian process $$p(\gamma_i^1) = \frac{1}{(2\pi)^{\frac{n}{2}}(|V_i|)^{\frac{n}{2}}} \exp\left(-\frac{1}{2}\gamma_i^{1T} V_i^{-1} \gamma_i^1\right)$$

and $Y_{i;\theta}$ is a known dynamic profile with unknown arrival time $\theta$ and unknown magnitude $v$ as given in equation 8. The estimation problem is to compute the maximum likelihood estimate (MLE's) $\hat{\theta}(n)$ and $\hat{v}(n)$ based on the residual $\gamma_1, \ldots, \gamma_n$. In one embodiment, Willsky's generalized likelihood ratio test is used to solve both the detection and estimation problem. Willsky's generalize ratio test is described in the publications "A Generalized Likelihood Ratio Approach To Estimation In Linear Systems Subject To Abrupt Changes", Alan S. Willsky and Harold L. Jones, *Proc. IEEE Decision and Control*, pp. 108-112, Nov. 1974 and "A Generalized Likelihood Ratio Approach To The Detection And Estimation Of Jumps In Linear Systems", Alan S. Willsky and Harold L. Jones, *IEEE Transactions on Automatic Control*, Feb. 1976, which are hereby incorporated by reference.

The likelihood ratio when the jump occurs at time instant $\theta=\tilde{\theta}$ of magnitude $v=\tilde{v}$ is given by $$\Lambda_n(\tilde{\theta}, \tilde{v}) = \frac{p(\gamma_1, \ldots, \gamma_n | H_1, \theta = \tilde{\theta}, v = \tilde{v})}{P(\gamma_1, \ldots, \gamma_n | H_0)}.$$

The generalized likelihood ratio computes the likelihood ratio $$\Lambda_n = \frac{p(\gamma_1, \ldots, \gamma_n | H_1, \theta = \hat{\theta}, v = \hat{v})}{P(\gamma_1, \ldots, \gamma_n | H_0)},$$

where $\hat{\theta}$ and $\hat{v}$ are the maximum likelihood estimates of $\theta$ and $v$ under the hypothesis $H_1$ (i.e. $(\hat{\theta}, \hat{v})$=arg max$_{(\tilde{\theta},\tilde{v})}\Lambda_n(\tilde{\theta}, \tilde{v})$).

The decision function $g_n$ defined as the double maximization of $\Lambda_n$ over the parameters $\theta$ and $v$ is given by, $g_n$=max$_{1 \leq \theta \leq n}$d$^T$(n;$\theta$)C$^{-1}$(n;$\theta$)d(n;$\theta$) where $$C(n; \theta) = \sum_{i=\theta}^{n} Y_{i;\theta}^T V^{-1} Y_{i;\theta} \text{ and } d(n; \theta) = \sum_{i=\theta}^{n} Y_{i;\theta}^T V^{-1} Y_i.$$

The likelihood ratio is defined as l(n;$\theta$)=d$^T$(i;$\theta$)C$^{-1}$(n;$\theta$) d(n;$\theta$). The maximum likelihood ratio estimate (MLE) of $\theta$ is given by the value $\theta \leq n$ such that $\hat{\theta}_n$=arg max$_{1 \leq \theta \leq n}$ l(n;$\theta$). The decision rule is $$g_n = l(n; \hat{\theta}_n) \overset{H_1}{\underset{H_0}{\gtrless}} \varepsilon, \quad (11)$$

where the threshold $\varepsilon$ is chosen to provide a suitable trade off between false alarm and missed alarms. The MLE of $v$ is given by $\hat{v}_n(\theta)$=C$^{-1}$(n;$\theta$)d(n;$\theta$). This method requires that the search for $\theta_n$ be on the entire data set between 1 and n, which requires a bank of filters with increasing length. In practice, the search may be carried out on a data window of finite length M. Note that the length M also affects the missed probability. The false alarm and detection probabilities are calculated as, $P_F=P_0(\Gamma_1)=\int_\varepsilon^\infty$p(l=L|H$_0$)dL and $P_D(v, \theta)=P_1(\Gamma_1)=\int_\varepsilon^\infty$p(l=L|H$_1$,v,$\theta$)dL respectively. Since $$p(l = L | H_0) = -\frac{1}{2} \sum_{i=1}^{n} Y_i^T V^{-1} Y_i$$

under hypothesis $H_0$ and $Y_i$ are independent identically distributed gaussian random variables, p(l=L|H$_0$) is Chi-squared ($\chi^2$) density with n degrees of freedom. Similarly $$p(l = L | H_1) = -\frac{1}{2} \sum_{i=1}^{n} Y_i^T V^{-1} Y_i - \frac{1}{2} v_n(\theta) \sum_{i=\theta}^{n} Y_{i;\theta}^T V^{-1} Y_i$$

is a non-central $\chi^2$ density with noncentrality parameter $v^T$C(n;$\theta$)v. This shows that $P_D$ is dependent upon values of $\theta$ and v.

For specified $P_F$ or $P_D$, the threshold value $\varepsilon$ can be computed from the tables in "Handbook of Statistical Tables", D. B. Owen, *Addison Wesley, Reading. Mass.*, 1922. Given $\varepsilon$, the values $P_F$ or $P_D$ (v,$\theta$) can be computed similarly. In one embodiment, v is used as the minimum jump that is required to be detected and 0 as the size of the data window M to compute $P_D$.

Once a jump has been detected by a GLR detector, the MLEs $\hat{\theta}$ and $\hat{v}$ can be used to update the state estimate as $\hat{x}_{i|i,new}=\hat{x}_{i|i,old}+\{\Phi(i,\hat{\theta}-F[i;\hat{\theta}]\}\hat{v}$ and the covariance as $P_{i|i,new}=P_{i|i,old}+\{\Phi(i,\hat{\theta}-F[i;\hat{\theta}]\}C^{-1}[i,\hat{\theta}]\{\Phi(i,\hat{\theta})-F[i;\hat{\theta}]\}$. This adaptive filtering scheme can be used to detect successive jumps. The size of the data window has to be chosen carefully to ensure the stability of the scheme.

Figure 6:
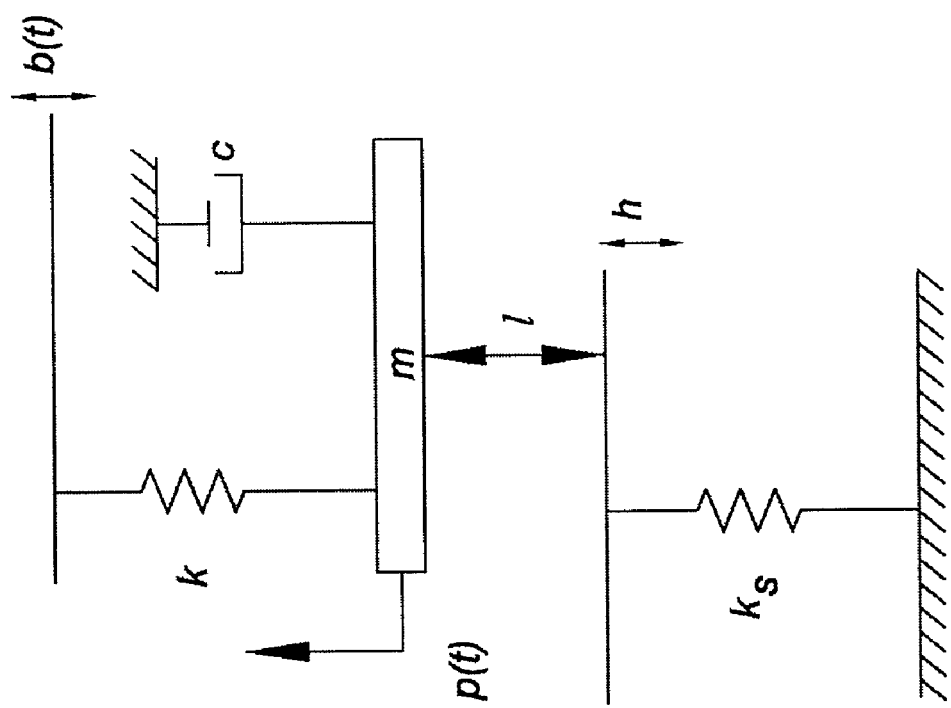
FIG. 6 is a block diagram of a cantilever-sample interaction model in accordance with the teachings of the present invention.
Figure 5:
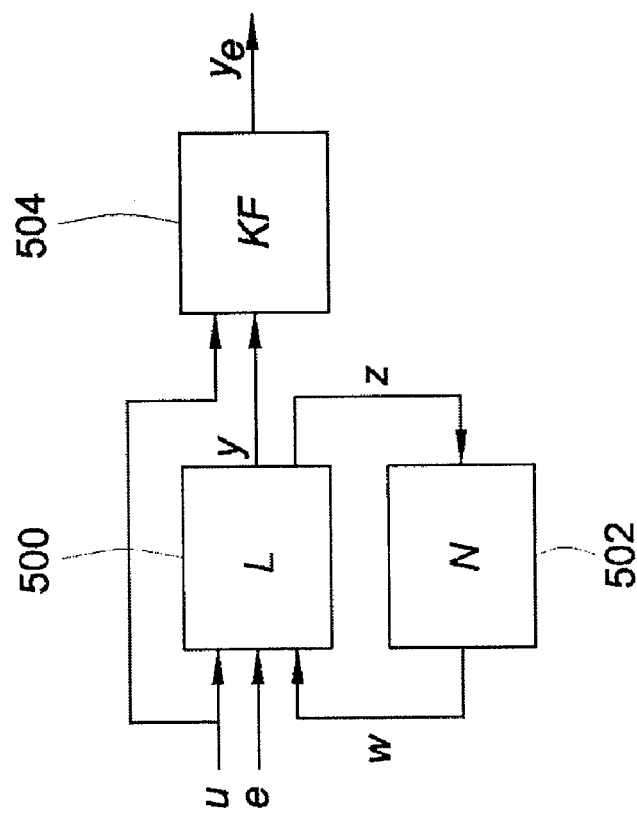
FIG. 5 is a block diagram of the observer based detection method in accordance with the teachings of the present invention.

Turning now to FIG. 5 the method of the present invention was simulated using Simulink in Matlab. The linear cantilever model 500 is given by equation 3, with natural frequency $f_0$=73,881 Hz, quality factor Q=130 and a sinusoidal forcing b(t) resulting in a free oscillation amplitude of $p_{max}$=24 nm. From testing, the mean deflection of the cantilever is 0.3 nm due to thermal noise during normal test conditions, which corresponds to input noise power to the model of Q=0.001 nmHz$^2$. The resolution of the photo-diode sensor in the AFM testing set up is 1 Å, which corresponds to output noise power R=0.1 nm. The discrete time filter 504 is designed using Matlab functions. For simplicity in the simulation, a purely repulsive cantilever-sample interaction model 502 as given in FIG. 6 is used. The cantilever interacts with the sample only when p(t)>1. The force from the sample is then given by $f_s$(t)=4h(t) pN. For simulation purposes, ks=4 pN/nm was chosen. This model corresponds to a static nonlinear block having a dead zone region of length 1. It is noted that a model that includes only the repulsive part of the cantilever-sample interaction is appropriate for many samples where the attractive regime is small.

Note that the observer based state estimation is sensitive to plant model uncertainties and experimental conditions that depend on thermal noise and sensor noise characteristics. In the simulations, the filter 504 is designed based on the actual model 204 and noise characteristics while the perturbed models of the cantilever and noise characteristics are employed as the real system.

Figure 7:
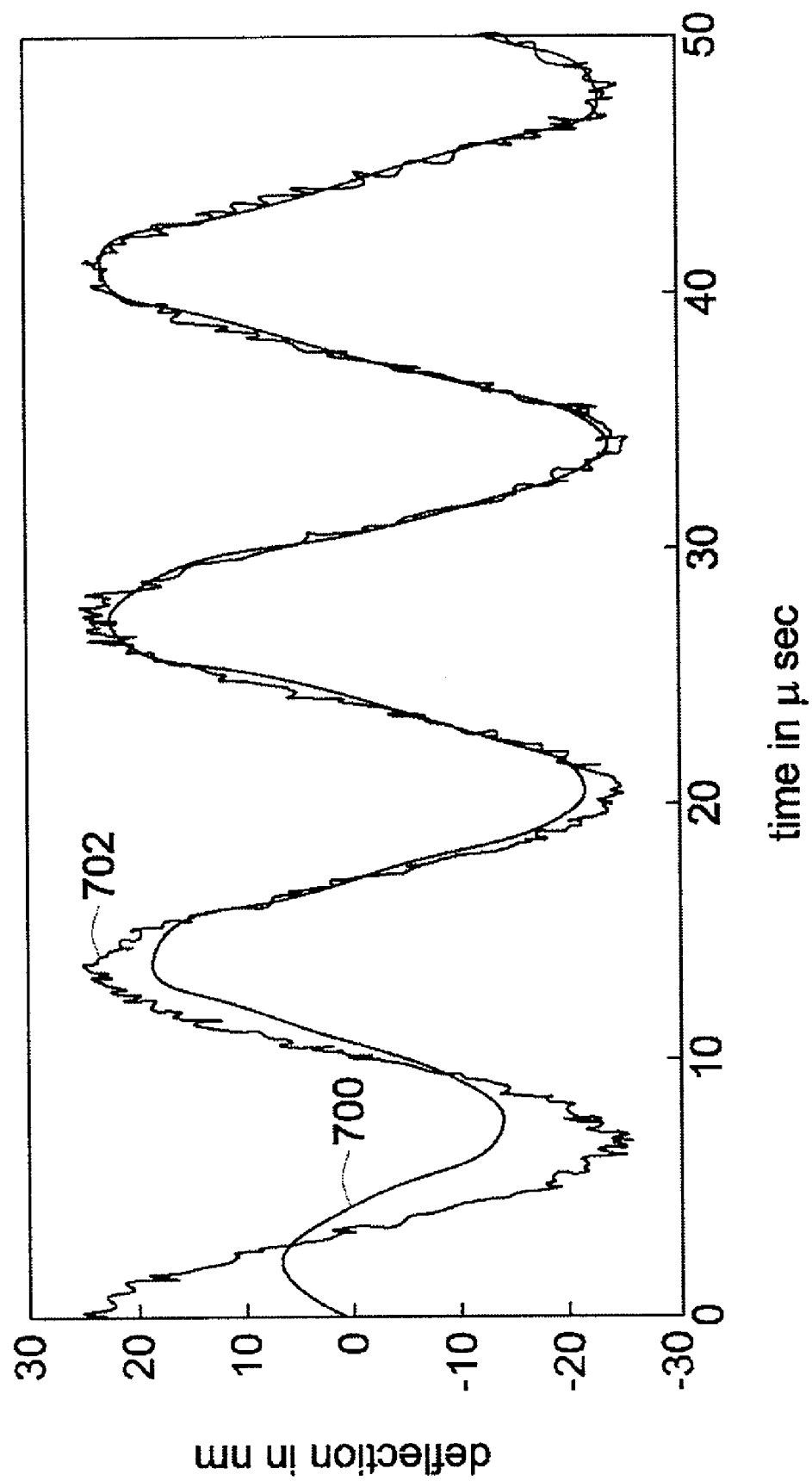
FIG. 7 is diagram illustrating the tracking of the observer of FIG. 5 with respect to the cantilever deflection signal.

Turning now to FIG. 7, the estimated deflection (curve 700) of the cantilever from the filter 504 is plotted with the actual deflection (curve 702). The initial estimation error seen in the first ten seconds is due to the mismatch in the initial state of the cantilever model 500 and the filter 504.

Figure 8:
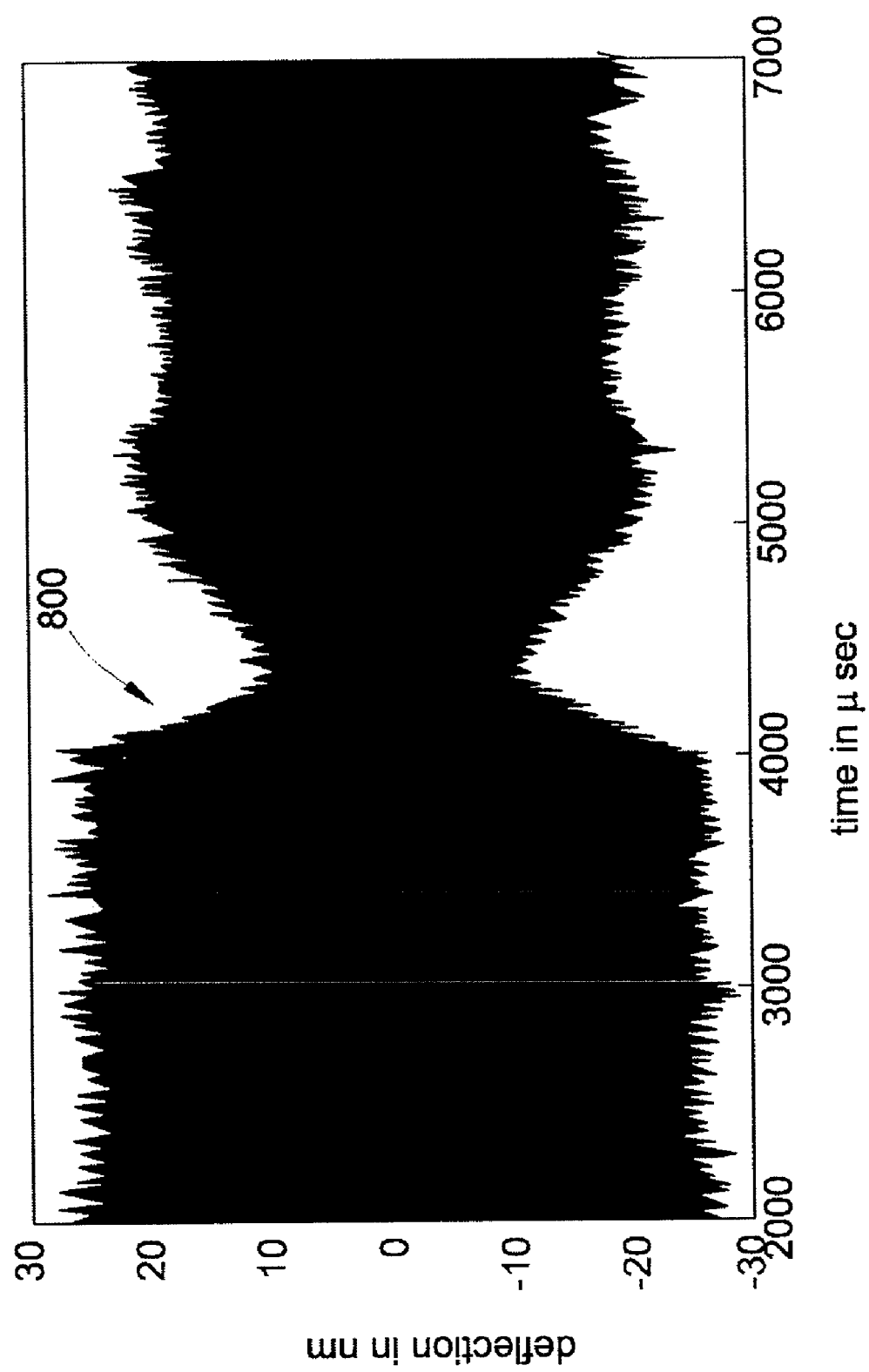
FIG. 8 is a graph of the deflection signal of a cantilever when the cantilever hits a sample.
Figure 9:
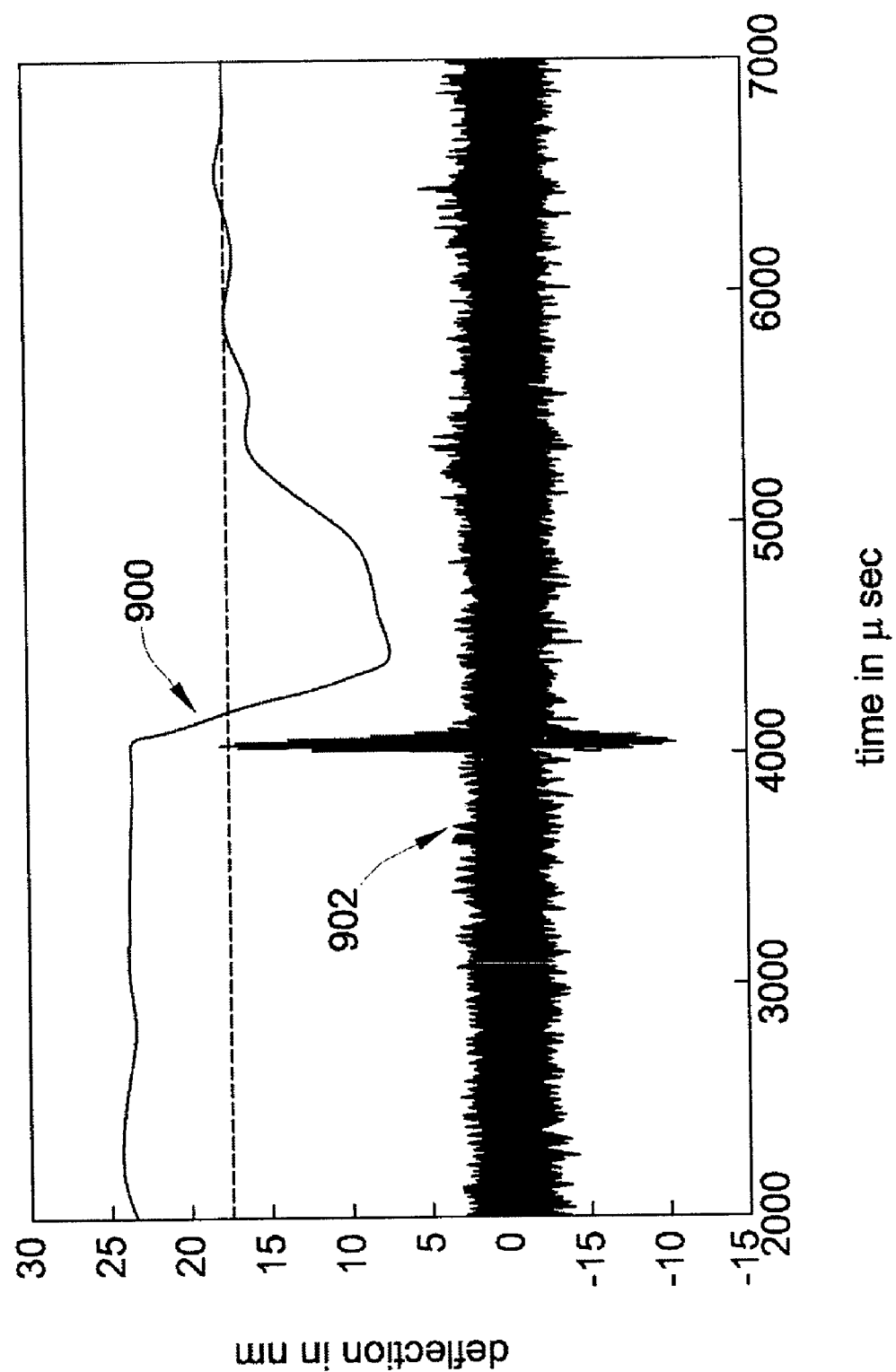
FIG. 9 is a plot of the error in estimation of the observer of FIG. 5 and a demodulated cantilever deflection signal of FIG. 8.

In FIG. 8, the cantilever deflection signal 800 is plotted when cantilever hits the sample of 4 nm height at time instant $\theta$=4000 μsecond. It takes approximately 1200 μseconds for the cantilever to reach the steady state. In FIG. 9, the innovation sequence (curve 900) and the error in estimation (curve 902) are plotted. The dashed line in curve 900 is a 18 nm threshold level for the detection scheme of the invention. There is an error in estimation as soon as the cantilever hits the sample. The change in the deflection is not immediately tracked by the observer 504. However, it can be seen that the observer 504 is fast enough to track the deflection signal during the transient state of the cantilever. It should be noted that in reality, the estimation error approaches a zero mean white noise much before the system stabilizes to a periodic orbit.

Figure 10:
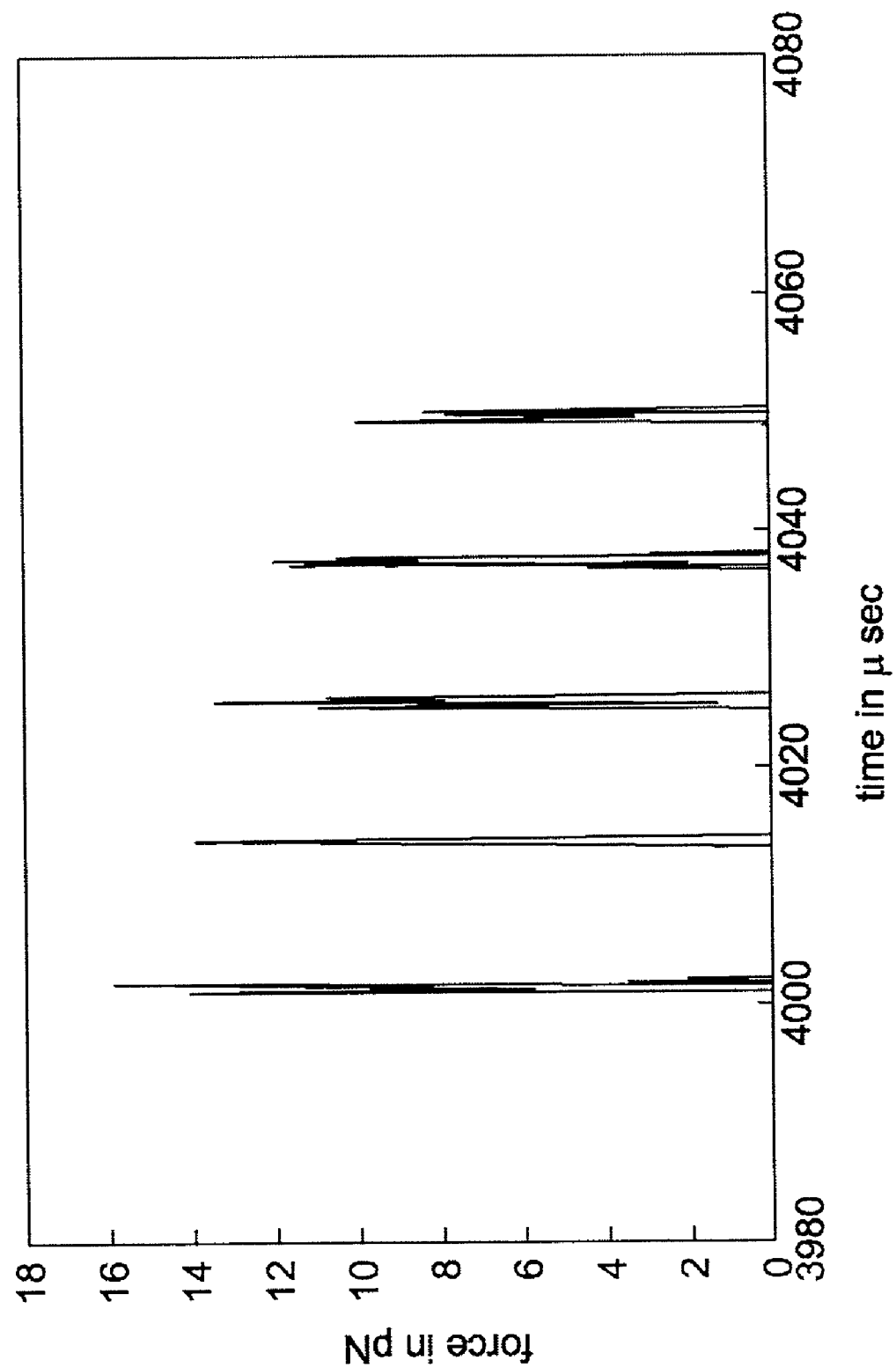
FIG. 10 is a plot showing the cantilever-sample interaction force of the cantilever of FIG. 1 when the cantilever hits a sample of 4 nm height.

FIG. 10 shows a typical cantilever-sample interaction force 1000 observed when the cantilever encounters a step sample profile of 4 nm high during simulation. This repulsive force is high in magnitude and exists for a smaller time compared to the time-period of oscillation of the cantilever.

It is observed that the time spent by the cantilever away from sample is 12 times of what is spent near the sample. Note that for analysis purposes, this force is modeled as an impulsive force (i.e. instantaneous jump in state) as previously described and is not being directly applied during simulation.

Figure 11:
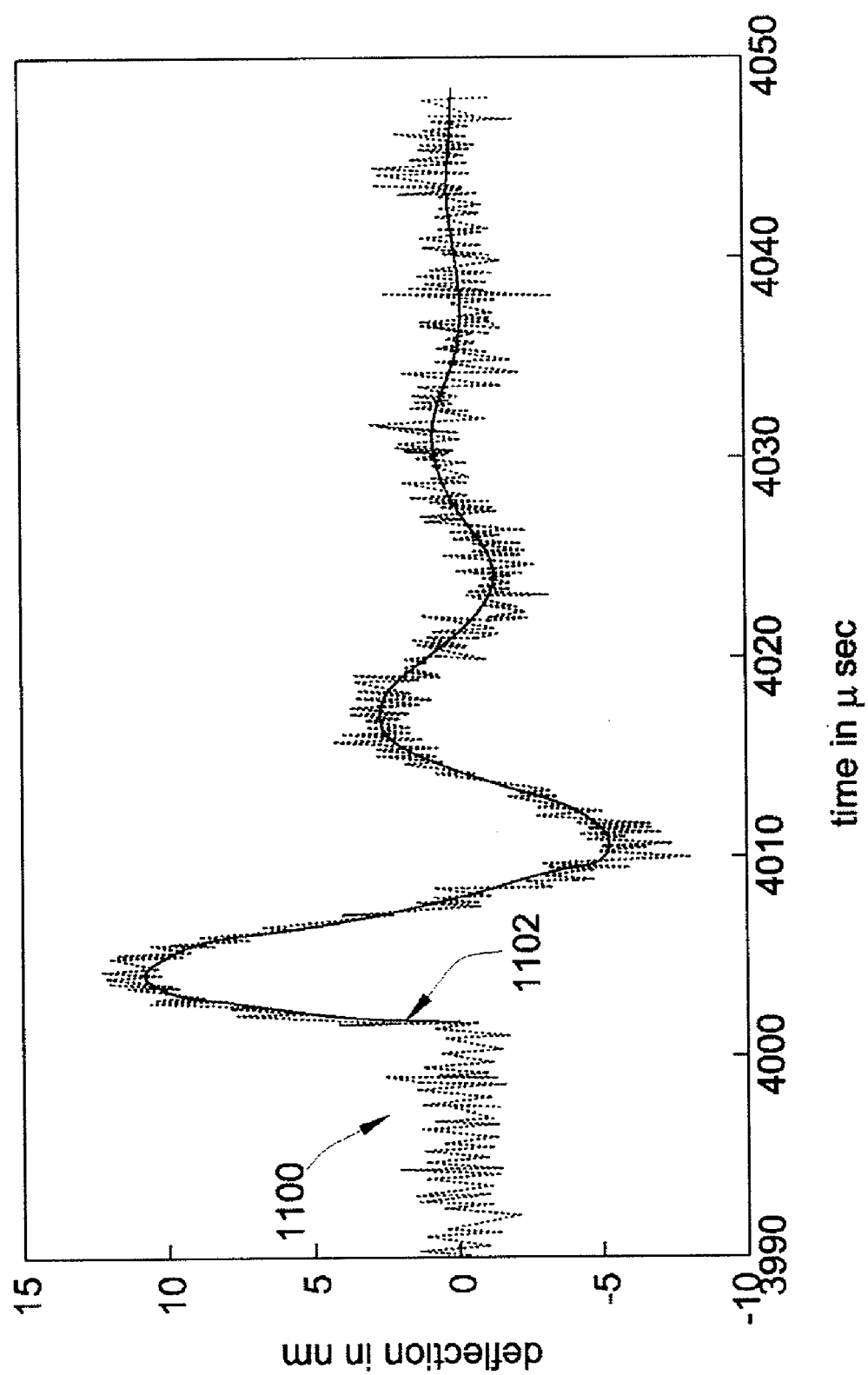
FIG. 11 is a plot showing innovations from the observer of FIG. 5 and an estimated dynamic profile in accordance with the teachings of the present invention.

In FIG. 11, the estimation error (dashed curve 1100) is plotted with the calculated dynamic profile (solid curve 1102) when the arrival time and the magnitude are assumed to be known. It can be seen from FIG. 11 that the residual innovations from the filter 504 can be modeled as a known dynamic profile with an unknown magnitude as implied by equation 8 with additive white Gaussian noise.

Figure 12:
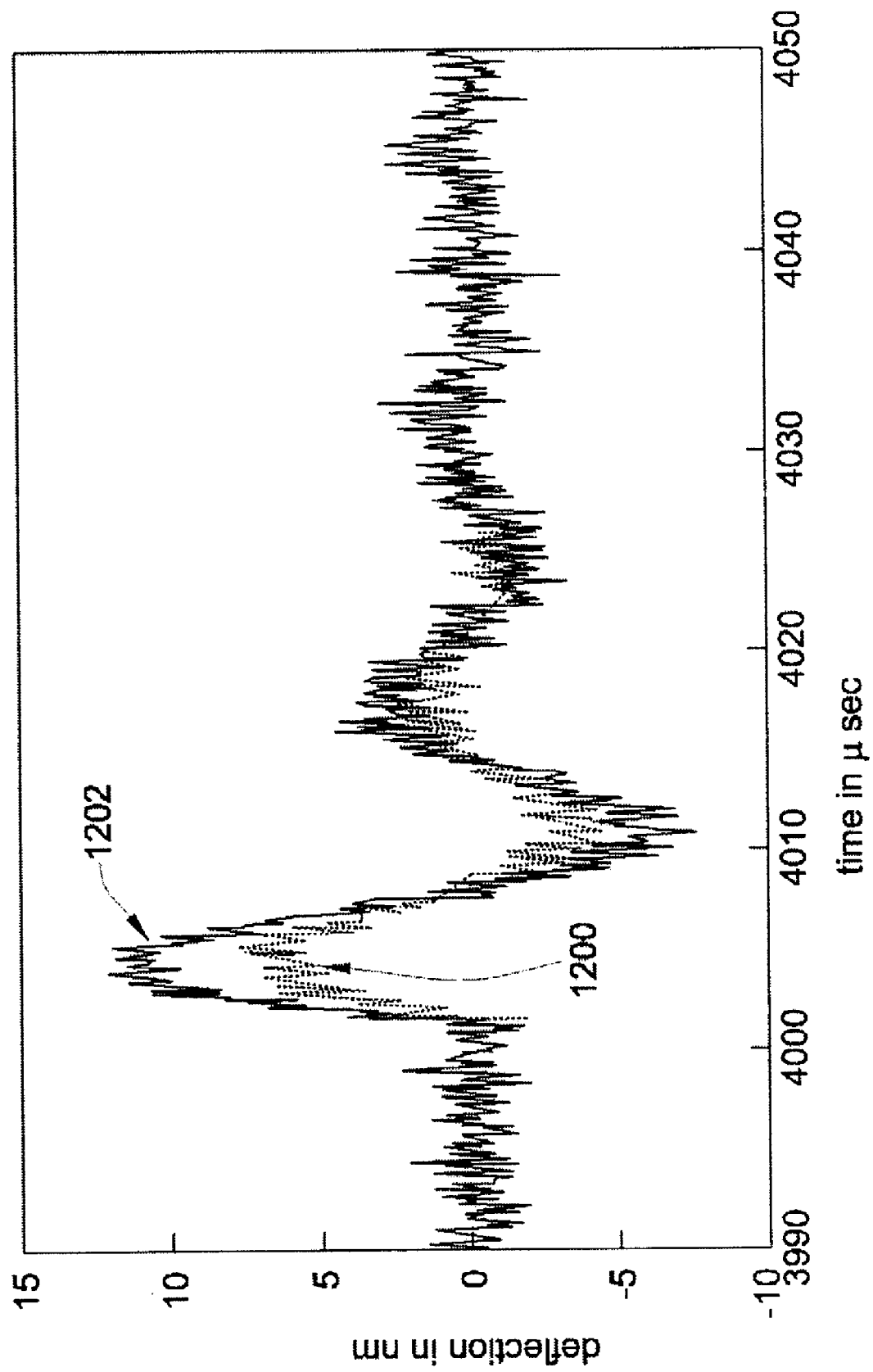
FIG. 12 is a plot showing innovations from the observer of FIG. 5 in accordance with the teachings of the present invention when the cantilever of FIG. 1 has a single hit with a sample of 2 nm and 4 nm height.
Figure 13:
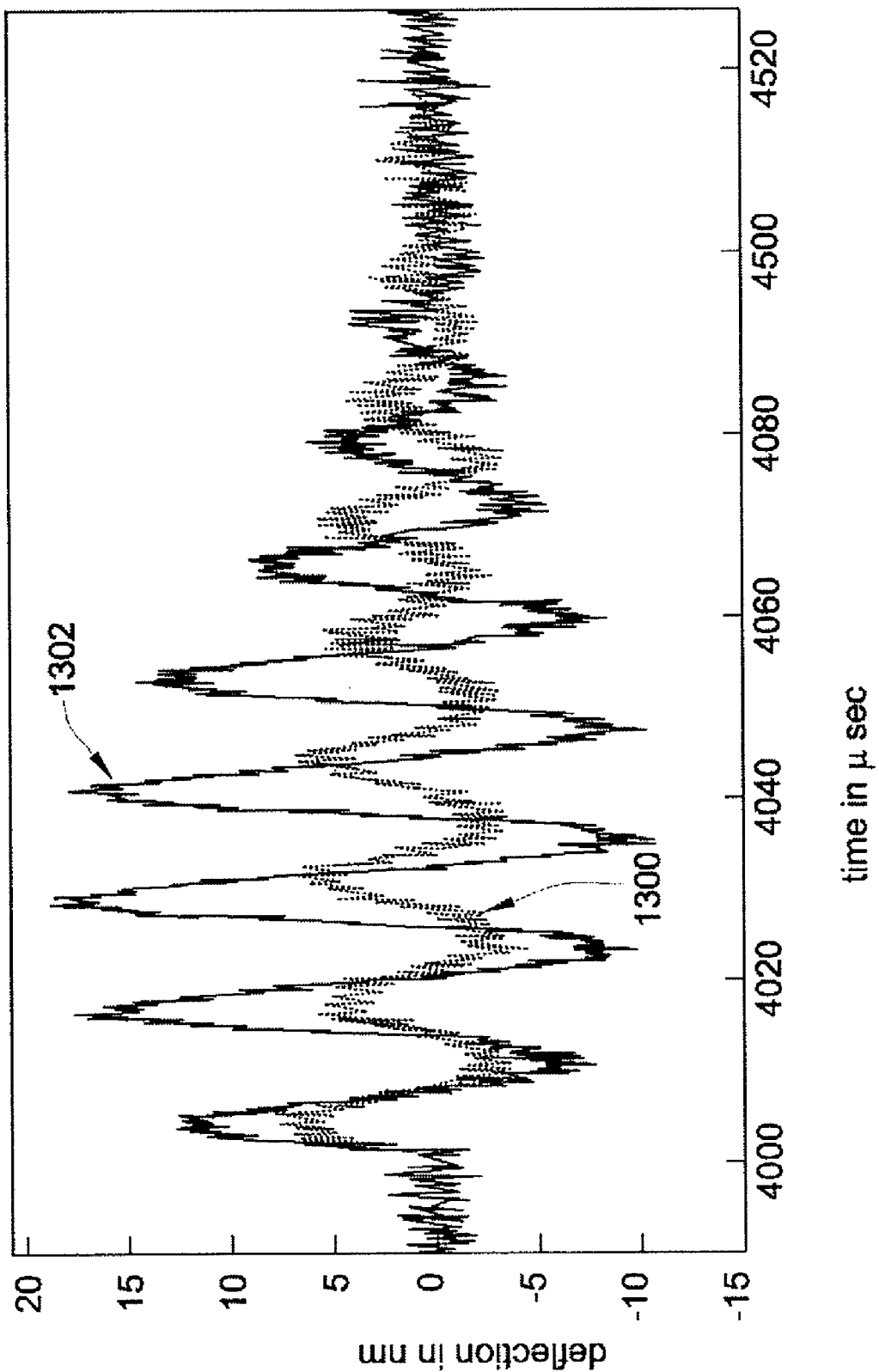
FIG. 13 is a plot showing innovations from the observer of FIG. 5 in accordance with the teachings of the present invention when the cantilever of FIG. 1 has multiple hits with a sample of 2 nm and 4 nm height.

In FIG. 12 the innovation sequence is plotted when the cantilever has a single hit with the sample of heights 2 nm (dashed curve 1200) and 4 nm (solid curve 1202). FIG. 13 plots the innovation sequence when the cantilever has multiple hits with the sample of heights 2 nm (dashed curve 1300) and 4 nm (solid curve 1302). For the single hit case, the dynamic profiles are proportional to each other. However, this is not true for the multiple hits case as the dynamic profiles overlap with each other and the arrival time of them are not uniformly separated in time.

Figure 14:
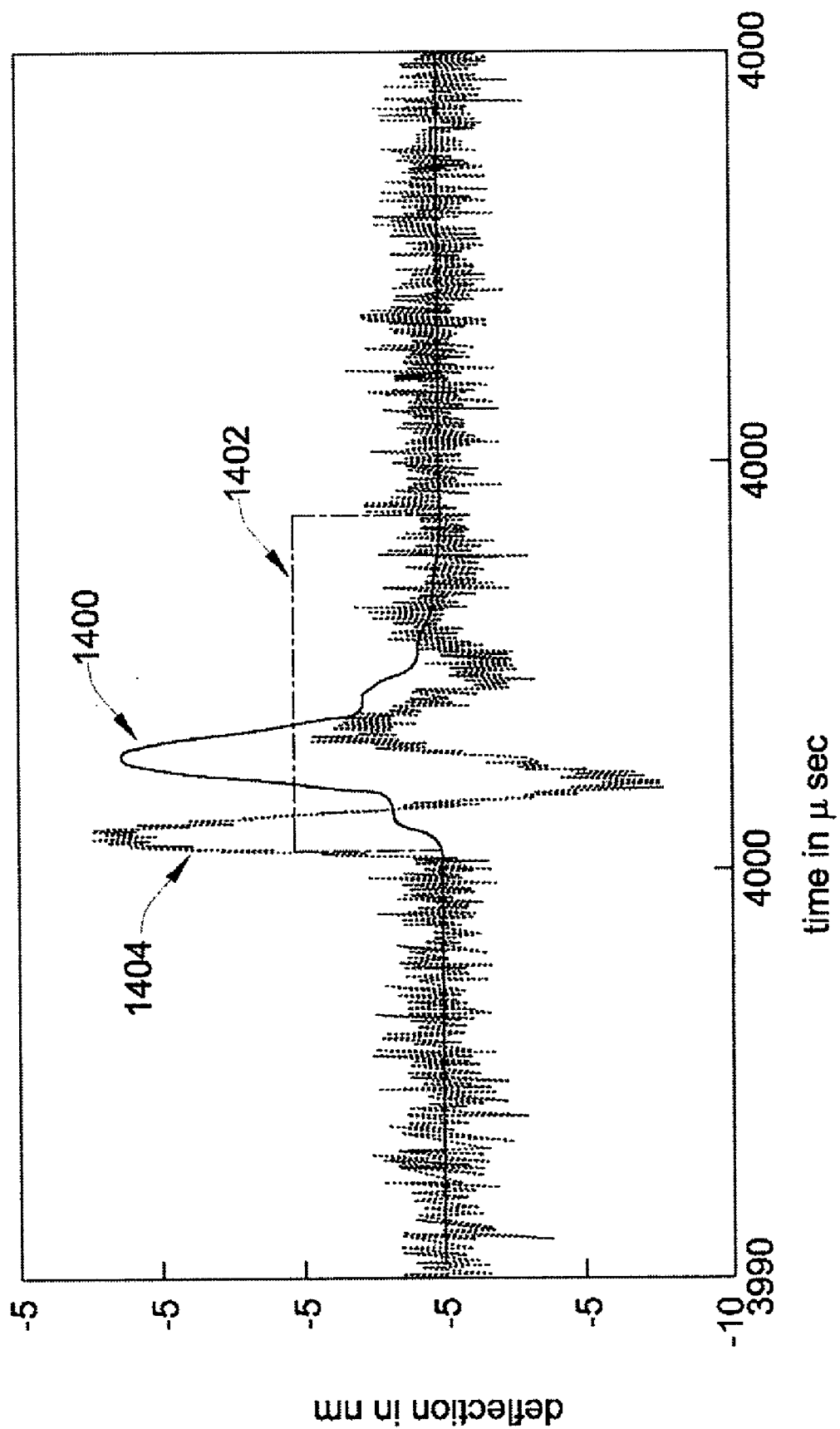
FIG. 14 is a plot showing innovations from the observer of FIG. 5 when the cantilever of FIG. 1 has a single hit with a sample of 4 nm height and a corresponding generalized likelihood ratio and decision rule in accordance with the teachings of the instant invention.
Figure 15:
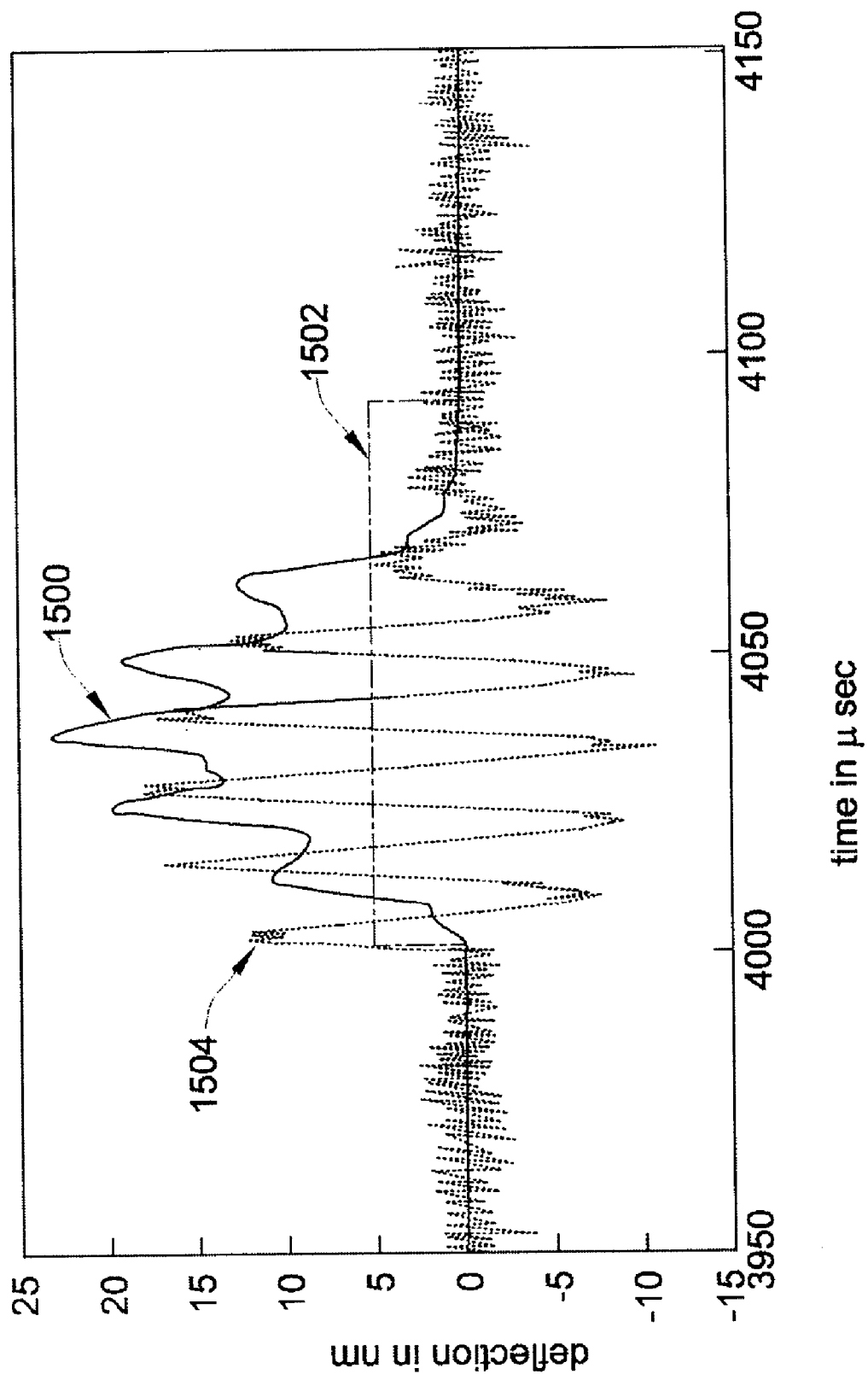
FIG. 15 is a plot showing innovations from the observer of FIG. 5 when the cantilever of FIG. 1 has multiple hits with a sample of 4 nm height and a corresponding generalized likelihood ratio and decision rule in accordance with the teachings of the instant invention.

We derived that when the cantilever hits the sample, the innovation sequence from the filter 504 consists of a dynamic profile of unknown arrival time and magnitude with additive white gaussian noise. Such detection and estimation problem is solved using the generalized likelihood ratio test (GLRT) as described above. Thus for simulation we used GLRT to detect the sample and estimate the size of impact. The unknown arrival time and the unknown magnitude of impact is estimated in maximum likelihood sense. The threshold $\epsilon$ is chosen to keep the false alarm rate below 1%. In FIGS. 14 and 15 the generalized likelihood ratio (solid curves 1400, 1500) and the decision rule (dash-dot curves 1402, 1502) are shown when the cantilever hits a repulsive sample once and multiple times respectively with the innovation sequence (dotted curves 1404, 1504). The generalized likelihood ratio plots are scaled down by a factor of $2*10^{-4}$ times to fit into the graph. The decision rule for detection is scaled by a factor of 5 for the same reason. Note that there is a delay between the occurrence of the jump and its detection. The delay depends upon the threshold value $\epsilon$ and the size of the data window. From simulations, it can be seen that the occurrence is accurately estimated after the delay.

Figure 16:
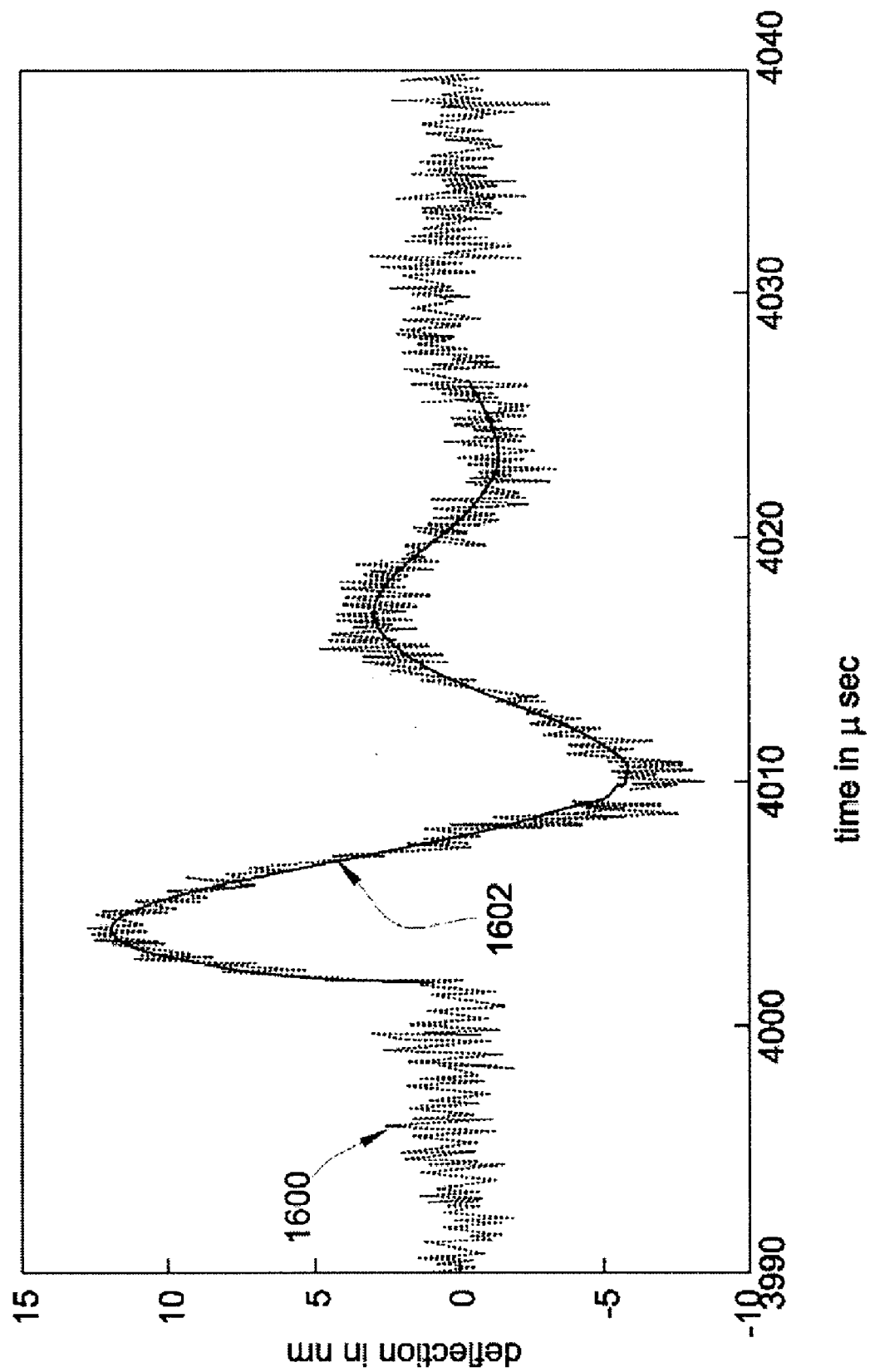
FIG. 16 is a plot showing innovation sequence data from the observer of FIG. 5 and an estimated dynamic profile in accordance with the teachings of the instant invention with a sample of 2 nm height.
Figure 17:
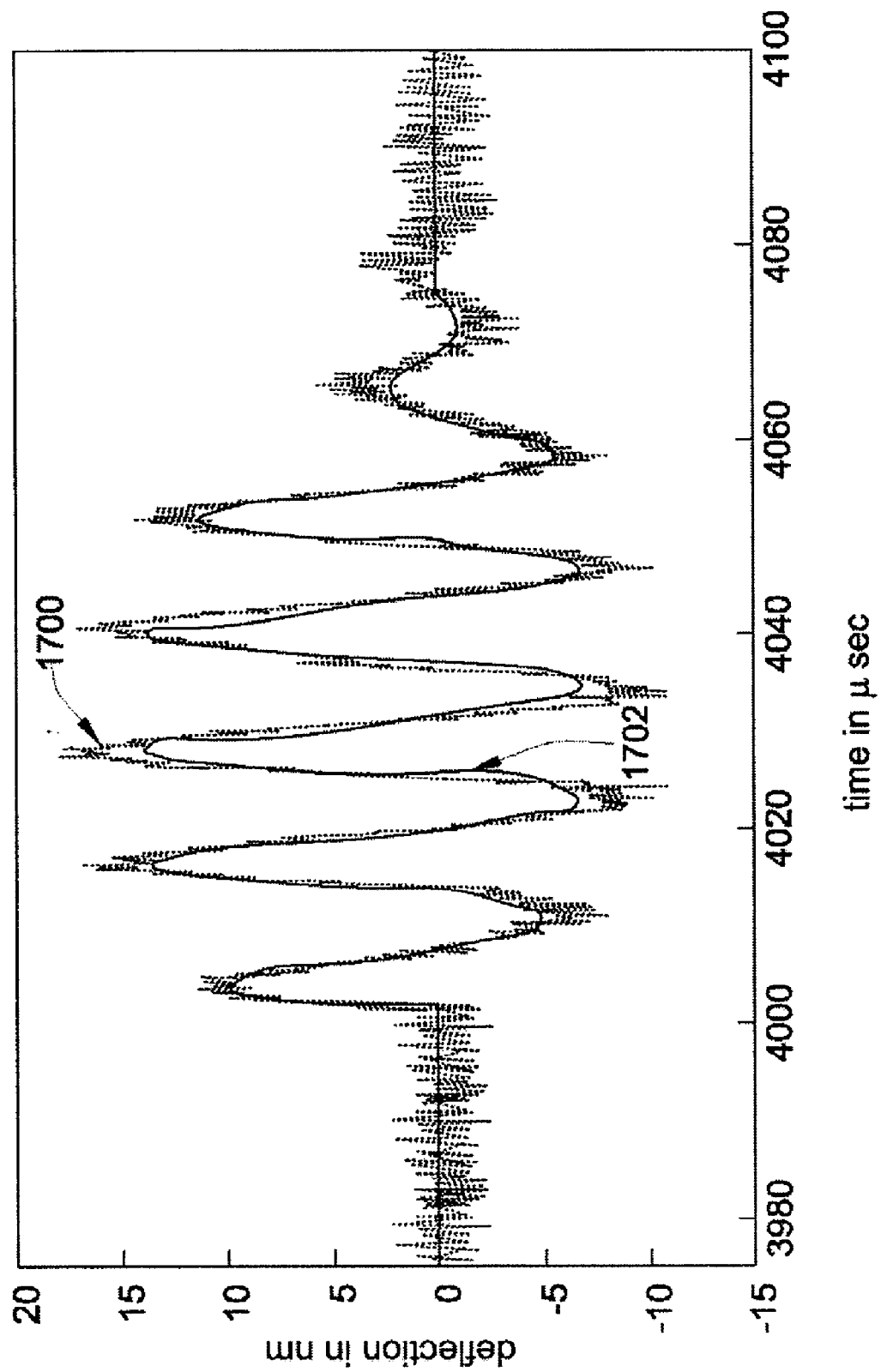
FIG. 17 is a plot showing innovation sequence data from the observer of FIG. 5 and an estimated dynamic profile in accordance with the teachings of the instant invention with a sample of 4 nm height.

In FIGS. 16 and 17, the estimated dynamic profiles (curves 1602, 1702) are plotted against the innovation sequence data (curves 1600, 1700) with a sample of 4 nm height. FIG. 16 shows the single hit case and FIG. 17 shows the multiple hit case. Note that for FIG. 17, adaptive filtering is used to update the innovation sequence after successive detection and estimation. The good match between the two plots suggests the efficient performance of the GLRT algorithm even for the multiple hits case when the successive hits (jumps) are not widely separated in time. Note that for the multiple hit case, one has to be careful in choosing the finite data window size to keep the false alarm and missed alarm rates low.

Conventional detection schemes rely on steady state amplitude and phase data. In the simulation model it takes approximate 1200µ seconds to reach a steady state periodic orbit. In conventional detection schemes that depend on demodulated amplitude profile, a threshold is chosen as 0.8 times the steady state amplitude. The invention takes around 200 µseconds to detect the jump considered for simulation. The transient data exists for 60 µseconds and the decision based on GLRT is made within 20 µseconds. Thus, transient data based detection is at least 10 times faster than the conventional case. For a single hit case, the estimation of jump is therefore 600 times faster compared to steady state estimation.

Experiments were performed to further verify the efficacy of the new transient signal based approach described herein. The slowness of the piezo (the Z component of the X-Y-Z scanner for sample positioning dynamics makes it difficult to generate a waveform of pulses in the order of tens of microseconds. The approach used is to make use of the piezo dynamics to generate a testing waveform. The frequency response of the piezo was obtained using an HP control system analyzer and a model was fit to the response. The model response is compared with that obtained experimentally in FIGS. 18a and b. Curve 1800 is the model magnitude response, curve 1802 is the experimental magnitude response, curve 1804 is the model phase response and curve 1804 is the experimental phase response. It can be seen that the magnitude and phase responses of the model and experimental data substantially overlap.

Figure 19A:
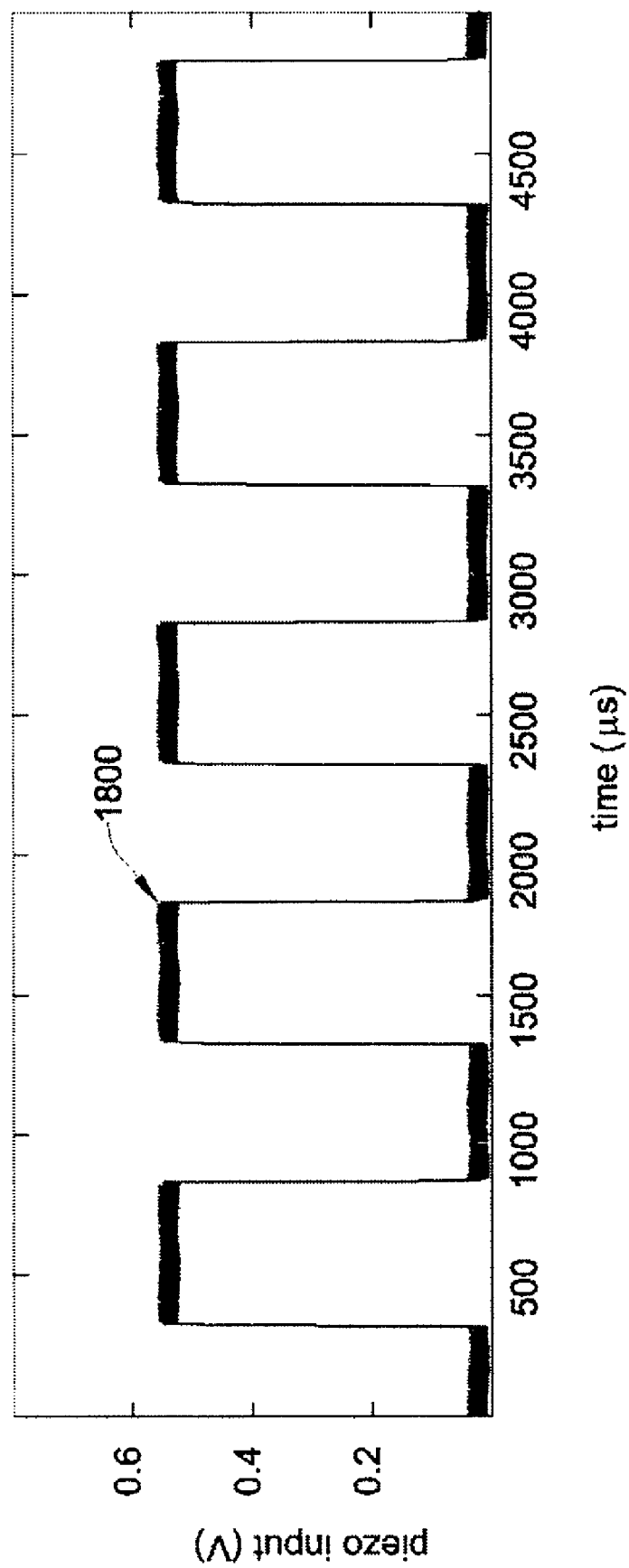
FIGS. 19a and b are graphs illustrating an input voltage and the piezo response to the input voltage.
Figure 19B:
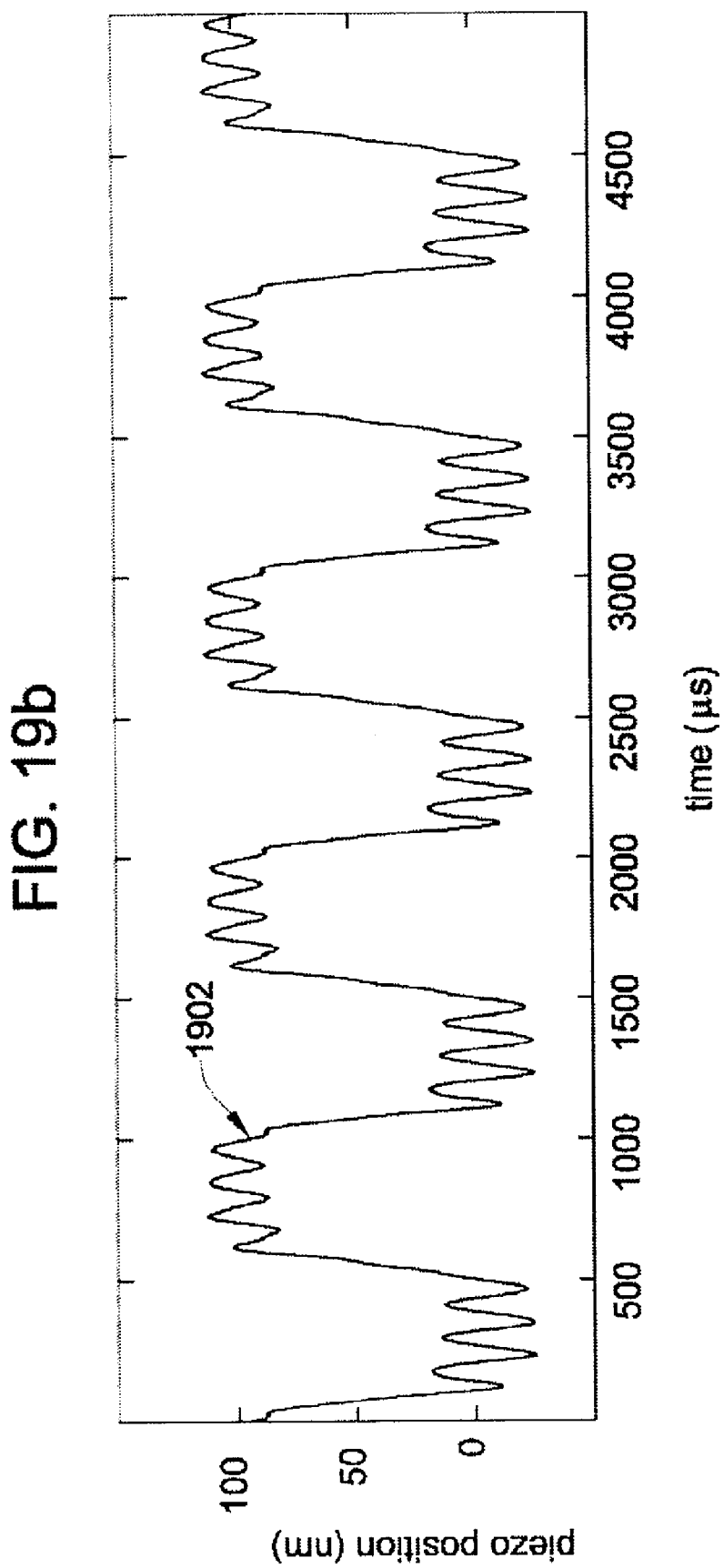
Figure 20B:
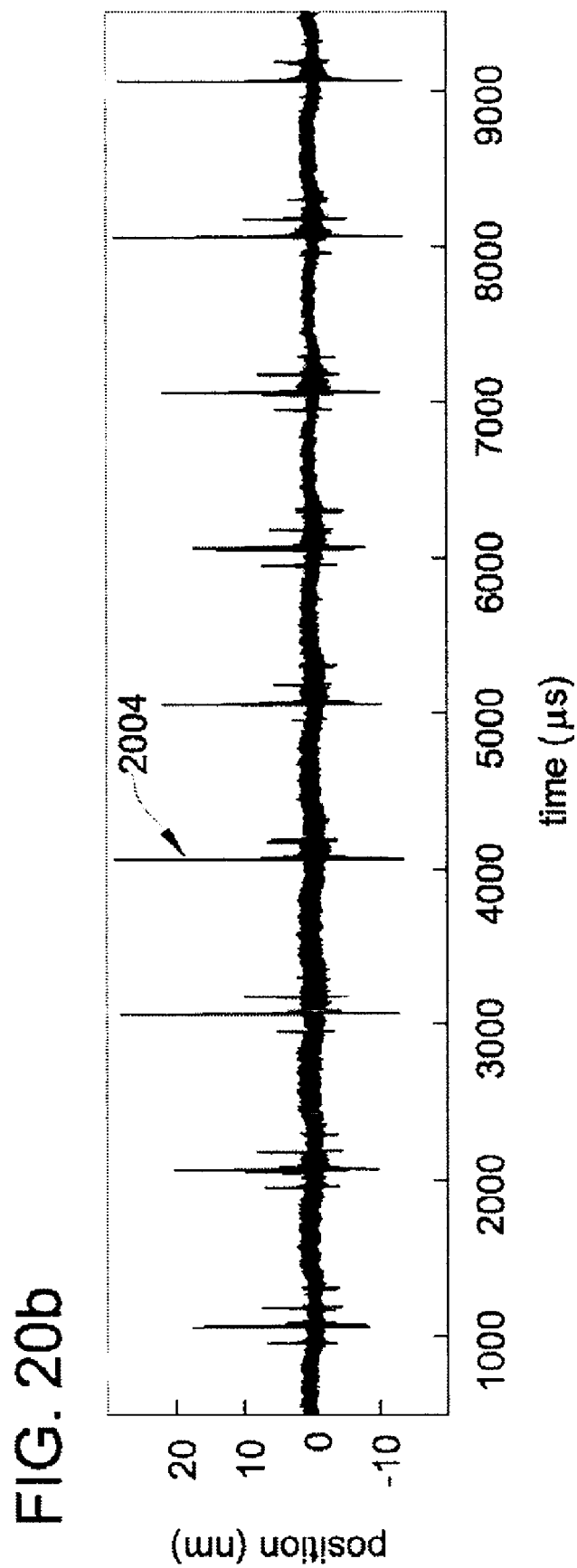
Figure 21B:
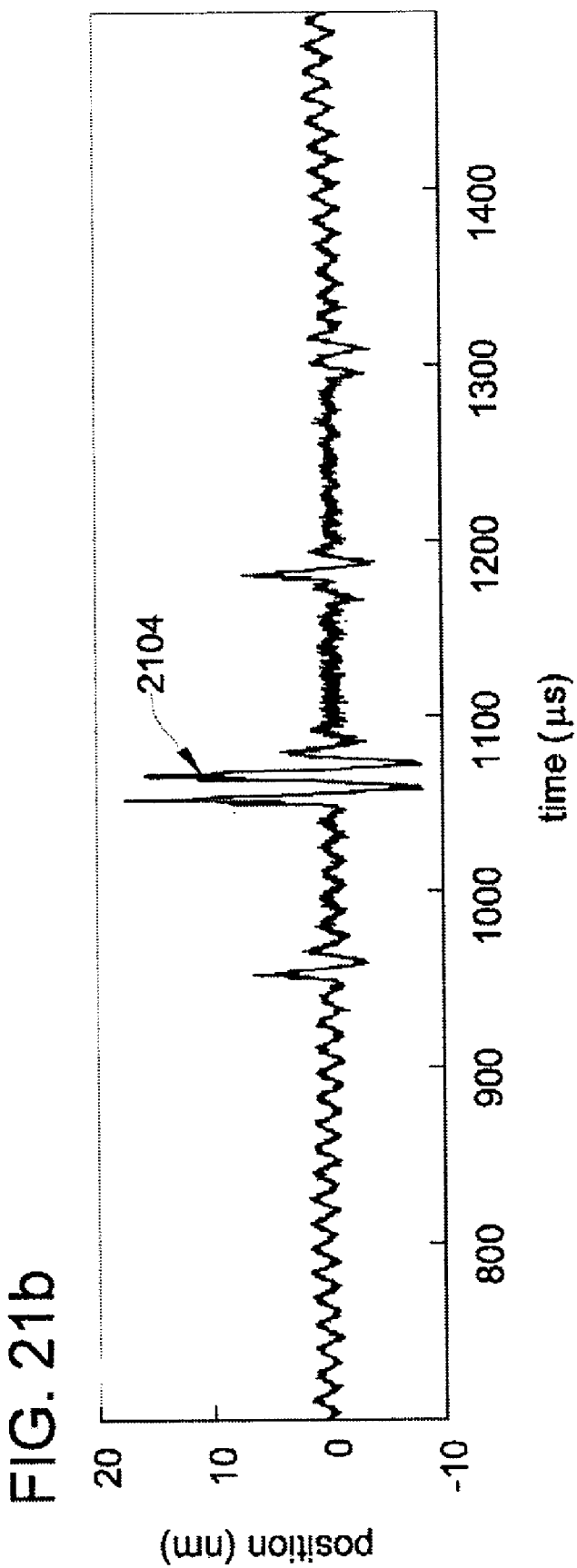
Figure 22A:
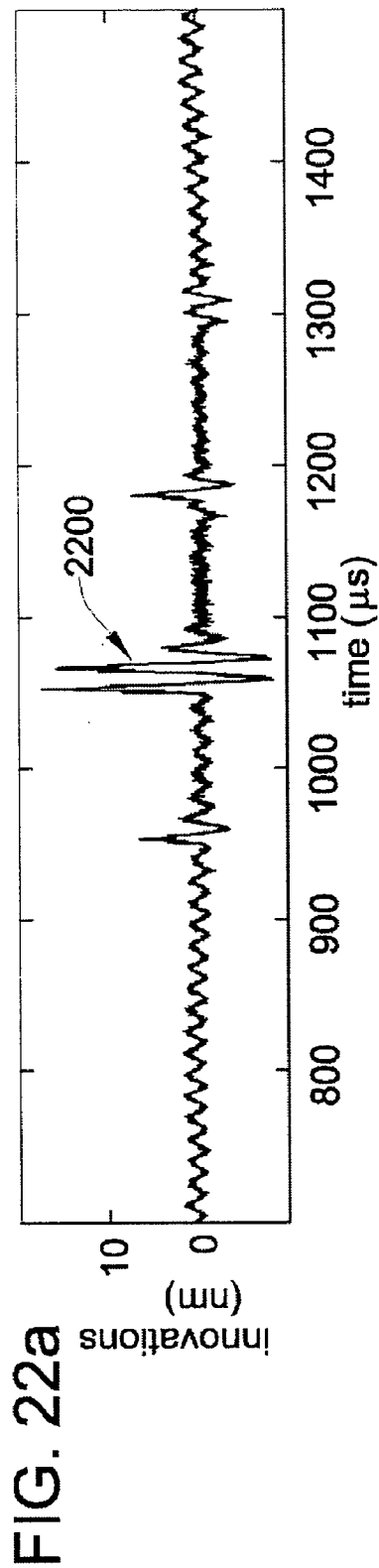
FIGS. 22a-c are graphs illustrating the innovation and likelihood ratio with respect to a piezo movement.
Figure 22B:
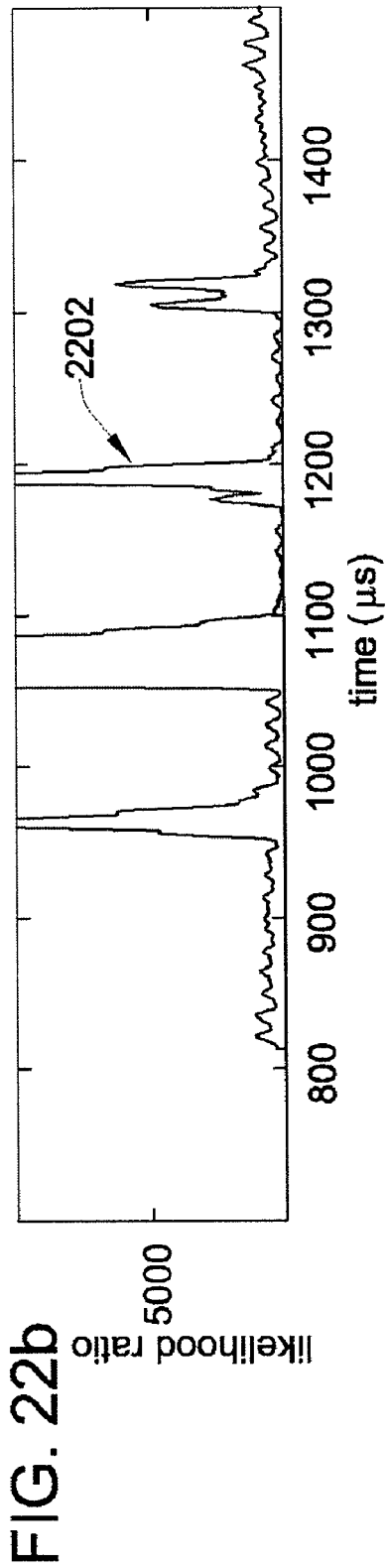
Figure 22C:
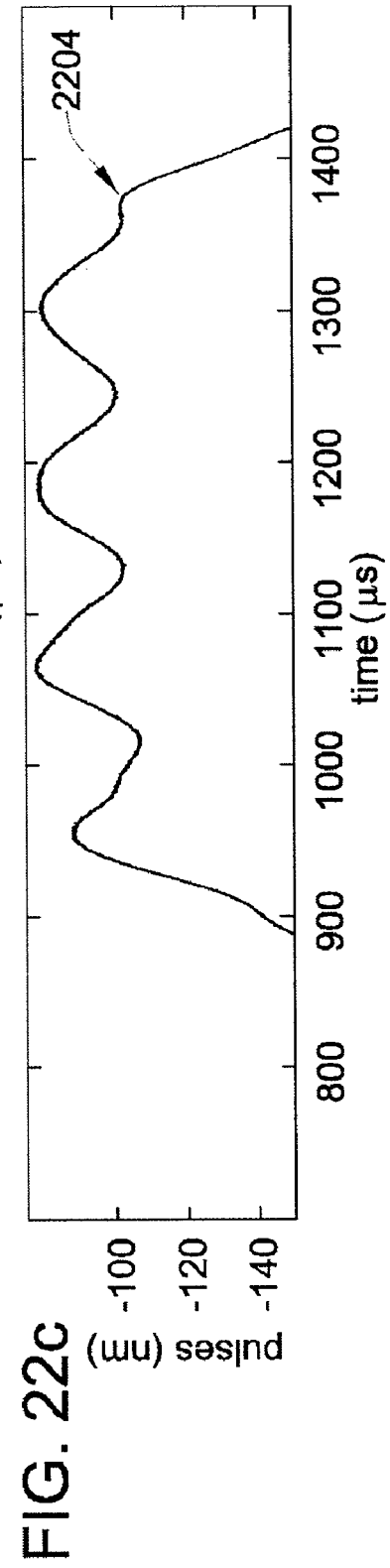

Simulations were performed using the model to obtain the input signals to the piezo. FIG. 19b shows the response of the piezo to a voltage pulse shown in FIG. 19a of amplitude 0.5V, period 1000 µs and on time 500 µs with the four peaks during the on time separated by approximately 100 µs. Curve 1900 is the input voltage pulse and curve 1902 is the piezo response. The piezo dynamics results in the occurance of 4 peaks separated by approximately 100 µs during the on time. The maximum width of each peak is approximately 35 µs. The cantilever is oscillated at the first resonant frequency of 70.1 kHz. The amplitude of oscillation was approximately 80 nm and the oscillating tip of the cantilever was approximately 100 nm away from the sample surface. The piezo is actuated with the voltage pulse mentioned above. The oscillating cantilever interacts with the resulting peaks. The objective is to detect these peaks using the transient signal scheme. A two mode model was obtained for the cantilever with the first resonance at 70.1 kHz and the second resonance at 445 kHz. This model is used to build the observer and obtain the innovation sequence. The resulting innovation sequence is shown in FIGS. 20a, b and 21a, b. In FIGS. 20a and 20b, the cantilever deflection signal is plotted against the pulse shape generated using the piezo dynamics. Curve 2000 is the cantilever deflection, curve 2002 is the piezo position, and curve 2004 is the innovations. It is difficult to detect when the cantilever interacts with the peaks looking at the deflection signal 2000. The innovation process, on the other hand, bears the signature of the hits. Every time the cantilever interacts with the sample, the Innovation curve loses the zero mean white nature as can be seen. In other words, the innovations become non-white when there is a hit and a dynamic profile appears. This dynamic profile is detected using the techniques described above. In FIGS. 21a and b, curve 2100 is the cantilever deflection, curve 2102 is the piezo position, and curve 2104 is the innovation sequence. It can be seen that the innovations show signatures of all four peaks and that the dynamic profile is clearly seen when the hits occur. The resulting likelihood ratio is shown in FIGS. 22a-c. In FIGS. 22a-c, curve 2200 is the innovation sequence, curve 2202 is the likelihood ratio, and curve 2204 is the piezo movement. Using the likelihood ratio it is possible to accurately detect the hits as predicted by the simulations proving the efficacy of the transient signal based detection scheme.

The GLRT is a computationally expensive algorithm. A simplified version of GLRT can be used where maximization over $\theta$ is replaced with $\hat{\theta}=n-M+1$. Another simplification is SLGR where maximization over $v$ is replaced with a prior fixed $\hat{v}$. These simplified algorithms require a wise selection of data window size M and prior fixed $\hat{v}$.

Figure 23A:
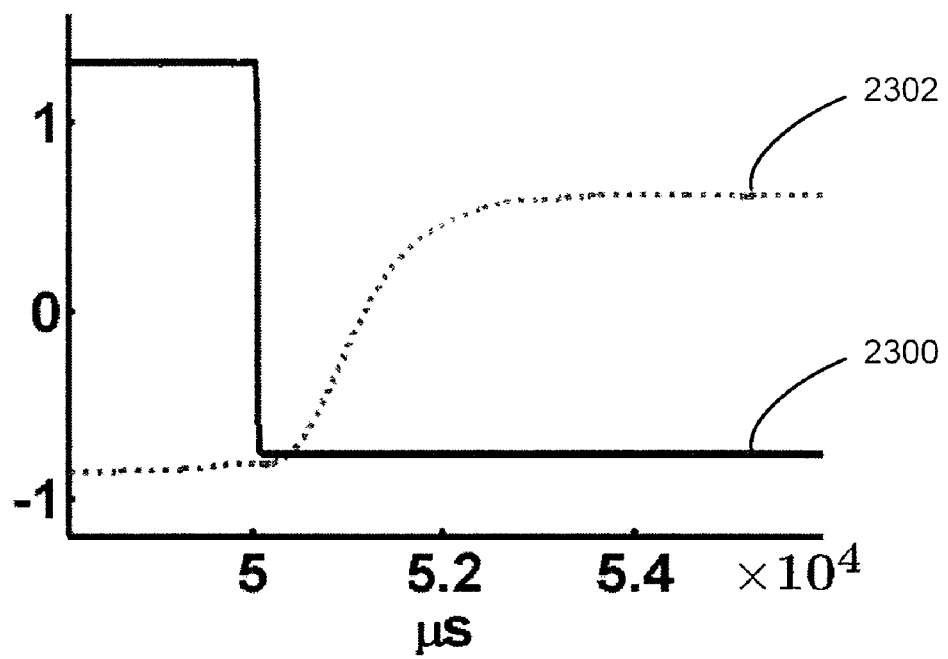
FIG. 23a is a graph illustrating a uniform rectangular sample profile and cantilever amplitude showing that the cantilever loses interaction with the sample when using error signal mode imaging.
Figure 23B:
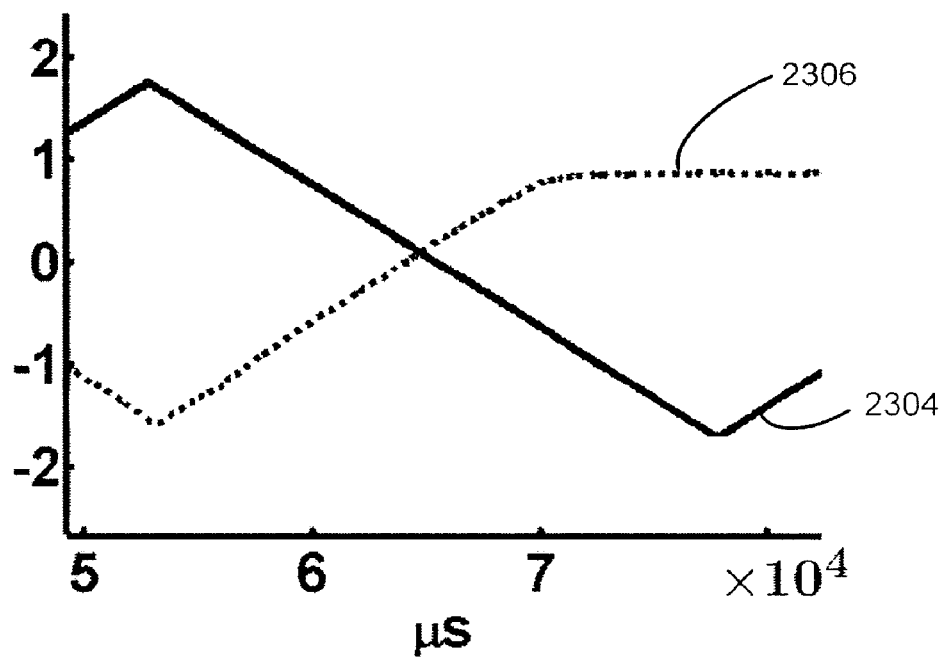
FIG. 23b is a graph illustrating a uniform triangular sample profile and cantilever amplitude that shows that the cantilever amplitude of the triangular sample profile is similar to the cantilever image of the rectangular sample profile of FIG. 23a when the cantilever loses interaction with the sample.

As previously discussed, a drawback common to all existing deflection based imaging schemes is that when the cantilever loses its interaction with the sample (a "sensor-loss condition"), it is not possible to glean any information about the sample from the cantilever deflection. The vulnerability of the dynamic mode AFM operation to sensor-loss can be seen in FIGS. 23a-b and 24a-b that present images of uniform rectangular and triangular sample profiles respectively at 20 Hz spatial frequency by a Multimode AFM, manufactured by Veeco Metrology Inc. A silicon cantilever with resonant frequency $f_0$=71.3 KHz and quality factor Q=124 was utilized. In FIG. 23a when the cantilever comes off the sharp edge on the sample profile 2300, it loses contact with the sample. Throughout the duration between the sharp edge and the "steady state" amplitude 2302, the cantilever is not interacting with the sample. FIG. 23b shows a triangular sample profile 2304 and the cantilever amplitude 2306. It can be seen that the amplitude signal of the cantilever amplitude in FIG. 23a is similar to the amplitude signal in FIG. 23b. However, in FIG. 23b, the cantilever is responding to the surface interaction and the image is a true reflection of sample topography. Clearly the amplitude signal in FIG. 23a is not a true reflection of the sample topography. Thus it is evident that similar amplitude profiles can result when the cantilever is probing two different sample profiles.

Figure 24A:
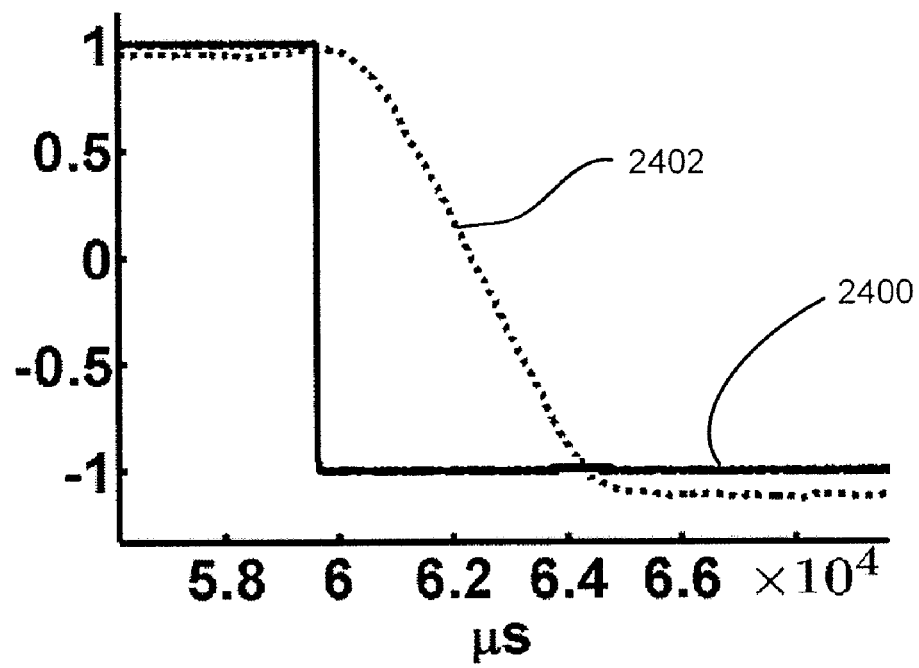
FIG. 24a is a graph illustrating a uniform rectangular sample profile and cantilever amplitude showing that the cantilever loses interaction with the sample when using tapping mode imaging.
Figure 24B:
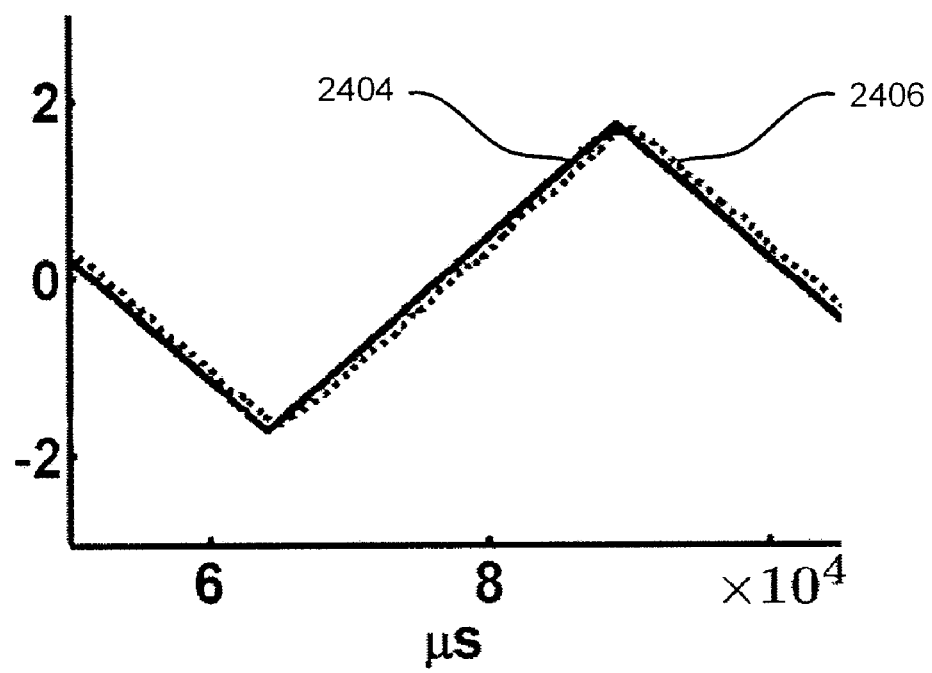
FIG. 24b is a graph illustrating a uniform triangular sample profile and cantilever amplitude that shows that the cantilever amplitude of the triangular sample profile is similar to the cantilever image of the rectangular sample profile of FIG. 24a when the cantilever loses interaction with the sample.

Images generated in TM-AFM also lead to ambiguous interpretation due to sensor-loss. FIGS. 24a and 24b show tapping mode imaging of rectangular and triangular profiles at 20 Hz respectively. As depicted, the height profile 2402 based on vertical actuation signal displays a smooth transition instead of a sharp edge as shown in the rectangular profile 2400 in FIG. 24a. The height profile generated while going down the ramp of the triangular sample 2404 in FIG. 24b is similar to sensor-loss region in FIG. 24a. Therefore, TM-AFM imaging can not determine the region of sensor-loss. While imaging the rectangular profile 2400, a sharp edge appears (see FIG. 24a) and the cantilever loses contact with the sample as can be seen in the cantilever amplitude 2402. During the time the cantilever loses contact, the feedback loop extends the piezo to come back into contact with the cantilever.

In one embodiment, the detection of the sensor-loss situation is fast enough to be of real-time use. Thus the method can be employed for correct interpretation of the image and can be used to minimize the sensor-loss affected region of the image by taking suitable corrective action. The real-time capability of determining sensor-loss depends on the use and accuracy of a mathematical model of the cantilever. Near its first resonant frequency, cantilever can be modeled as a spring-mass-damper system. Parameters of this system can be identified by frequency sweep or thermal excitation. During dynamic mode operation of AFM, when the sample is not present, the cantilever is subjected to mainly two external forces, namely, dither forcing ($g(t)$) and thermal noise ($\eta(t)$). In the presence of these forces, cantilever dynamics can be described by the following equation of motion:

$$\ddot{p} + \frac{\omega_0}{Q}\dot{p} + \omega_0^2 p = g(t) + \eta(t); [p0, \dot{p}(0)] \quad (12)$$

where $\omega_0 = 2\pi f_0$ is first resonant frequency of cantilever, Q is quality factor of the cantilever, p is cantilever deflection, p(0) is initial deflection and $\dot{p}(0)$ is the initial velocity. Note that equation twelve is similar to equation 1 with thermal noise added. The position of the cantilever is detected by the photo diode that generates voltage y=Sp+υ where S is photodiode sensitivity and υ is measurement noise.

Figure 25:
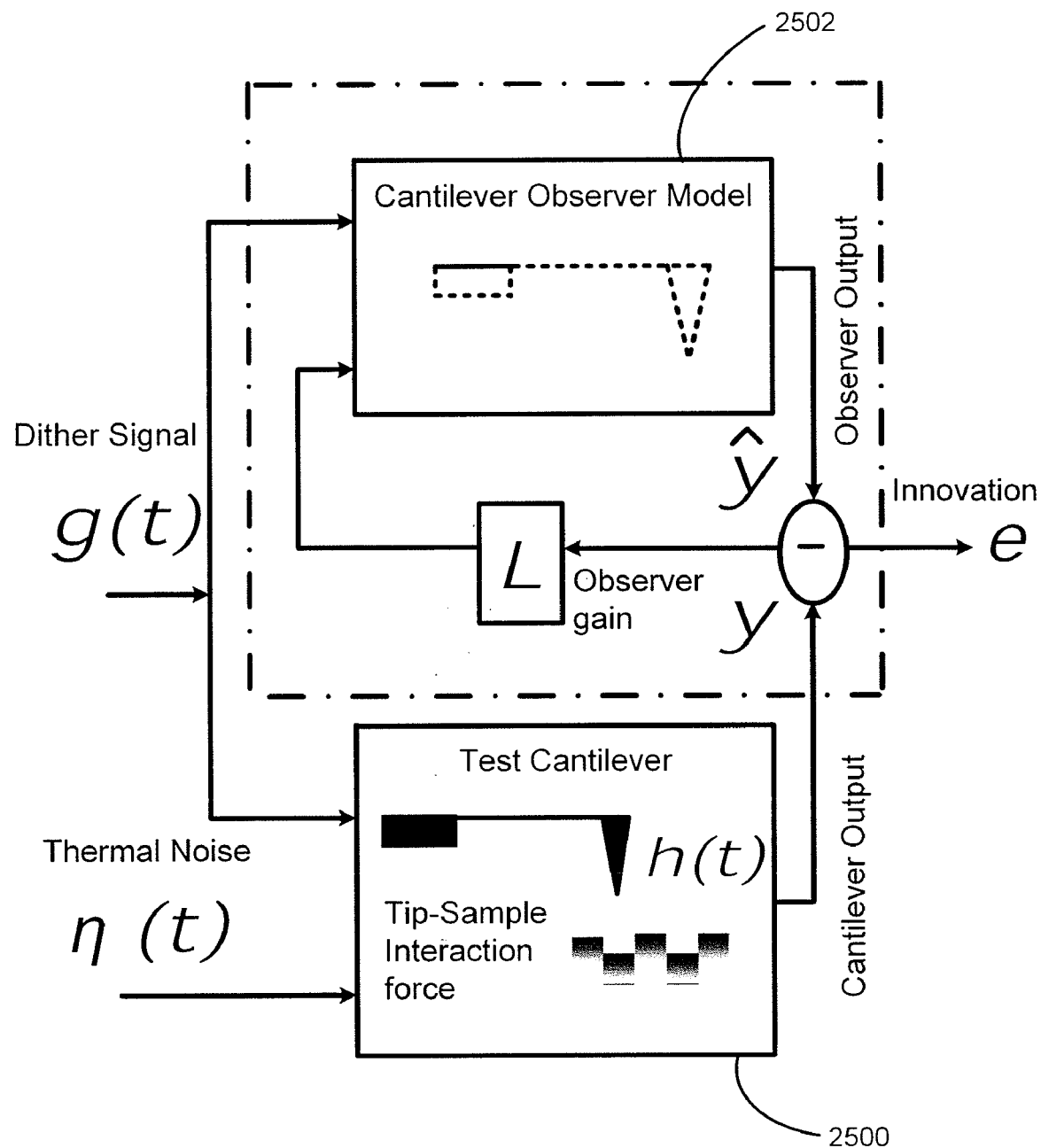
FIG. 25 is an illustration of an observer that is used to detect when the cantilever loses interaction with the sample in accordance with the teachings of the invention.

With these identified parameters, the cantilever dynamics can be modeled by an electrical circuit (see FIG. 25), which we call the observer of the cantilever. In FIG. 25, the dither signal g(t) is input to the cantilever 2500 and the cantilever observer model 2502. Thermal noise η(t) is input to the cantilever 2500. The cantilever output is compared to the cantilever observer model output and the difference e, which will be called innovation in the description below, is fed back as a correction signal as an input to the cantilever observer model 2502. The observer output voltage, ŷ, that follows the dynamics given by:

$$\ddot{\hat{y}} + \frac{\omega_0}{Q}\dot{\hat{y}} + \omega_0^2 \hat{y} = g(t), [\hat{y}(0), \dot{\hat{y}}(0)] \quad (13)$$

where $\hat{y}(0)$ and $\dot{\hat{y}}(0)$ form the initial conditions of the observer state. When the cantilever is not interacting with the sample, the difference e between the cantilever deflection and the observer estimated deflection is governed by the equation:

$$\ddot{e}+\omega_0/Q\dot{e}+\omega_0^2 e=\eta(t); [e(0),\dot{e}(0)]:=[y(0)-\hat{y}(0), \dot{y}(0)-\dot{\hat{y}}(0)], \quad (14)$$

It is evident that this innovation is present due to the mismatch in initial conditions and the thermal noise η. Similar to the cantilever response, the innovation due to the initial condition mismatch dies out exponentially as $$e^{-\frac{\omega_0}{Q}t}.$$

This translates to Q cycles of cantilever oscillation for the response due to initial condition mismatch to die out. For many applications, the associated bandwidth is unacceptably low. However, utilizing the measured photodiode signal y, the decay rate of the innovation due to initial condition mismatch can be made much faster. In this scheme, a correction signal $u(t)=[l_1\ l_2]^{T*}[e(t)\ \dot{e}(t)]$ is added to g(t) and is given as an input to the cantilever observer model 2502. The error dynamics follows the equation:

$$\ddot{e} + \left(\frac{\omega_0}{Q}+l_1\right)\dot{e} + \left(\omega_0^2 + \frac{\omega_0}{Q}l_1 + l_2\right)e = \eta - l_1 v; [e(0)\ \dot{e}(0)], \quad (15)$$

where $L = [l_1\ l_2]^T$ is the gain of the observer.

From Equation (15) it can be shown that the initial condition mismatch becomes negligible in the innovation in $$\left(\frac{\omega_0}{Q}+l_1\right)^{-1}$$

cycles. Since the choice of the gain term $l_1$ is independent of the quality factor Q, the bandwidth of the innovation signal is effectively decoupled from Q. The main limitation on $l_1$ is due to sensor noise υ. For typical sensor noise values, the innovation can be made small in couple of cycles. Thus an effective method exists to track the cantilever deflection within a few cantilever cycles when the cantilever is not interacting with the sample.

Many small sample features can be modeled as causing an impulsive force on the cantilever. For example, in high data storage applications, the asperities that encode bits result in an impulsive force on the cantilever. The impulsive force resets the initial condition of the cantilever state. Thus, for such applications the mismatch in the observer output and the cantilever measured deflection forms the basis to detect bits. It is to be noted that the impulsive change is a short duration change and the observer can erase the effect of an abrupt impulsive change in a couple of oscillations. However, in the scenario of sensor-loss detection, what is desired is a method that is applicable to a change in the sample profile that is persistent, for example a step change in the sample profile. Under a persistent presence of the sample, the cantilever behaves as a modified cantilever with changed stiffness and changed resonant frequency. If the sample force is given by $h(p, \dot{p})$, the estimate of the change in cantilever frequency and quality factor is given by:

$$\omega_0'^2 = \omega_0^2 + \frac{2}{a}\frac{1}{2\pi}\int_0^{2\pi} h(a\cos\psi, -a\omega\sin\psi)\cos\psi\,d\psi \quad (16)$$

and $$\frac{\omega_0'}{Q'} = \frac{\omega_0}{Q} + \left(\frac{1}{a\omega}\frac{1}{\pi}\int_0^{2\pi} h(a\cos\psi - a\omega\sin\psi)\sin\psi\,d\psi\right), \quad (17)$$

where $\alpha$ is the steady state amplitude of the cantilever in the presence of the sample. Thus the cantilever behavior under the sample presence is given by:

$$\ddot{p} + \frac{\omega_0'}{Q'}\dot{p} + \omega_0'^2 p = g(t) + \eta(t) \quad (17)$$

Figure 26A:
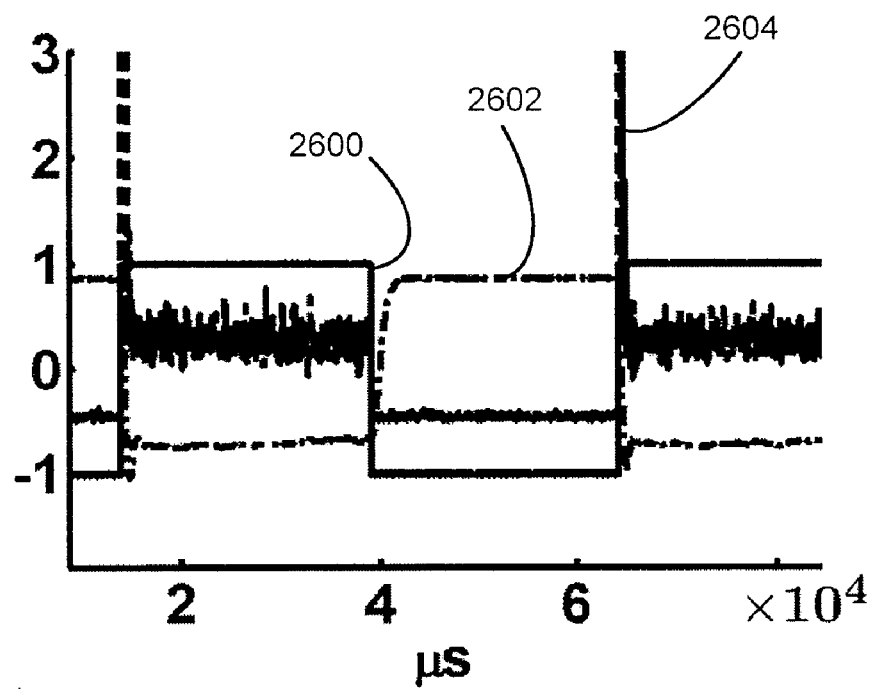
FIG. 26a is a graph illustrating how the innovation signal of the invention changes when the cantilever does not interact with an uniform rectangular sample.
Figure 26B:
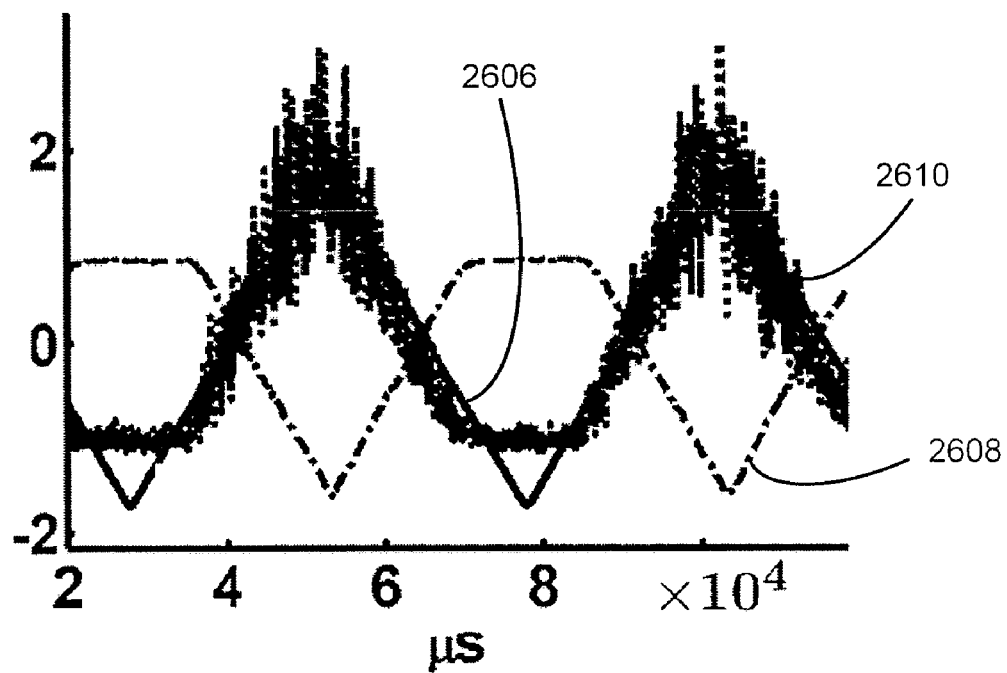
FIG. 26b is a graph illustrating that the rms innovation magnitude increases monotonically with cantilever-sample separation.

Note that the cantilever observer model still behaves according to equation (13) that incorporates the model parameters $\omega_0$ and Q of the original cantilever model. Thus the difference between the cantilever observer model and the cantilever is due to the change in the model parameters, which do not decay with time. This is unlike the change due to initial condition mismatch caused by an impulsive force. Thus for persistent changes, it is expected that the rms magnitude of the innovation signal will increase as the cantilever dynamics is governed by parameters different from the parameters employed by the observer. It stands to reason that greater the model mismatch, greater the magnitude of the innovation. This is evident in FIGS. 26a and 26b, where as the sample fixed in lateral direction is moved toward the cantilever, the rms value of the innovation increases. In FIG. 26a, the sample profile of a rectangular sample profile is line 2600, the cantilever amplitude is line 2602, and the innovation signal is line 2604. In FIG. 26b, the sample profile of a triangular sample profile is line 2606, the cantilever amplitude is line 2608, and the innovation signal is line 2610. As it is apparent from FIGS. 26a and 26b, the rms innovation magnitude increases monotonically with the cantilever-sample separation. It is to be noted that as soon as sample is removed, the cantilever behaves according to its original parameters and the innovation recovers near zero value in a couple of cycles. The method described herein relies on model mismatch due to cantilever-sample interaction and therefore can be applied in variety of imaging modes with different cantilever-sample interaction, e.g ESM, TM, small amplitude oscillation mode, and true non-contact mode.

Figure 27A:
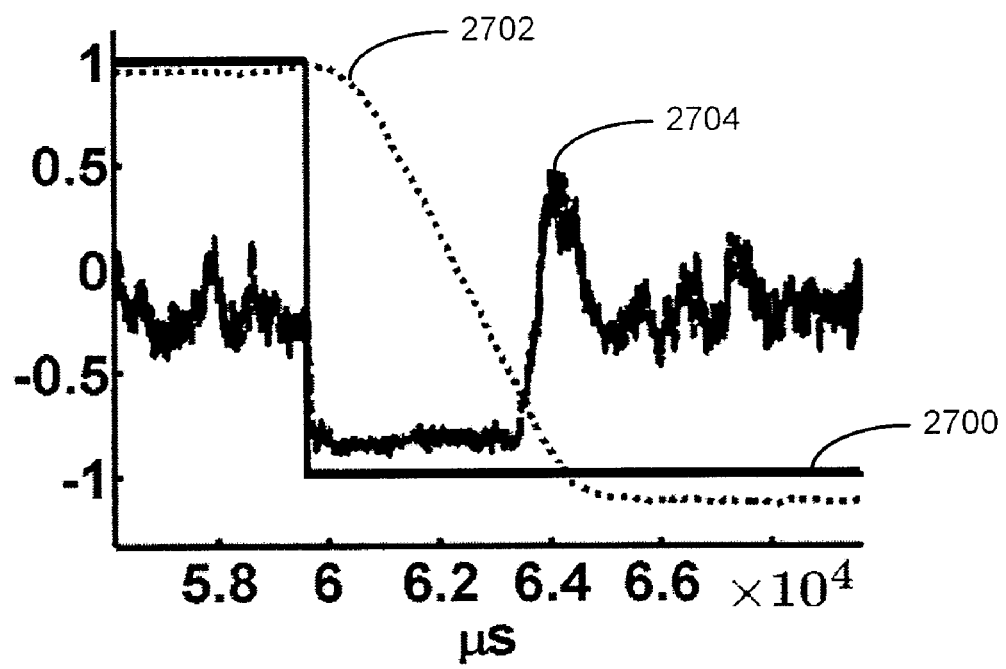
FIG. 27a is a graph illustrating that the innovation signal of the invention can be used for fast detection of the loss of cantilever interaction with a rectangular sample profile.
Figure 27B:
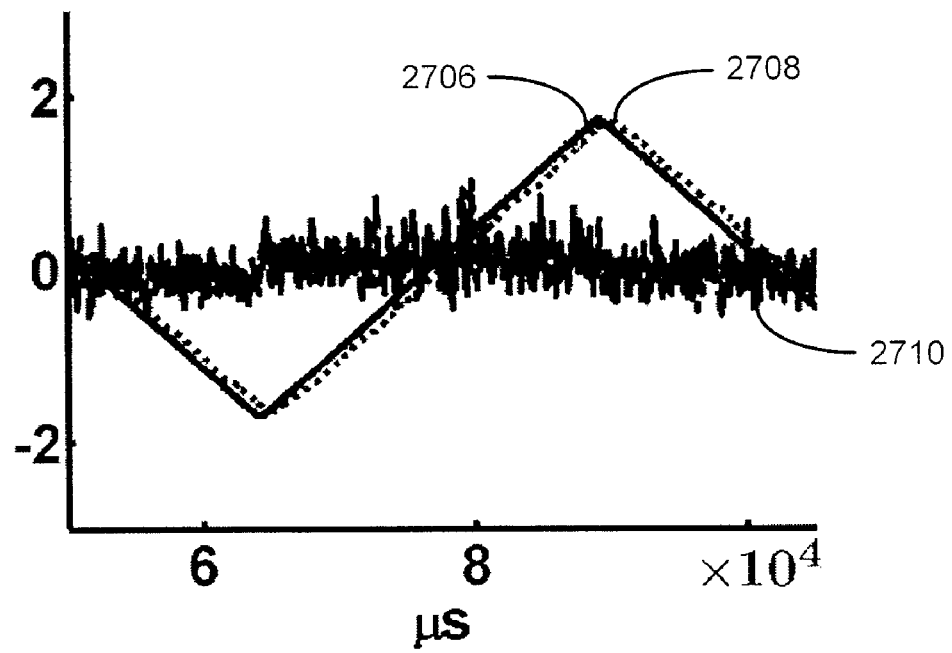
FIG. 27b is a graph illustrating that the innovation signal of the invention can be used for fast detection of the loss of cantilever interaction with a rectangular sample profile as the innovation signal indicates there is no loss of cantilever interaction in a triangular sample profile.

Now that the real-time sensor-loss detection model has been described, experiment results of how the sensor-loss situation can be detected in real-time, thereby indicating the area of the image that can be discarded, shall be described. Turning now to FIGS. 27a and 27b, sample profiles of a rectangular and triangular profile are shown along with the cantilever amplitudes and innovations. In FIG. 27a, the sample profile of a rectangular profile is line 2700, the cantilever amplitude is 2702, and the innovation signal is line 2704. In FIG. 27b, the sample profile of a triangular profile is line 2706, the cantilever amplitude is 2708, and the innovation signal is line 2710. A distinct change in variance of the innovation signal 2704 is observed when cantilever comes off the sharp edge while the cantilever amplitude 2702 does not indicate a sharp edge. In the absence of the cantilever-sample forcing, the observer model 2502 successfully tracks the cantilever deflection and the innovation signal decays exponentially. In FIG. 27a, a sharp edge appears in the sample profile. It is not until a later time that the feedback loop brings the sample in contact with cantilever. Between these times, the TM-AFM cantilever amplitude 2702 generates a smooth sample profile due to sensor-loss. Even though the TM-AFM image can not identify sensor-loss, the innovation signal magnitude drops almost instantaneously at the sharp edge, triggering a sensor-loss detection. In one embodiment, the sensor-loss detection occurs when the innovation signal magnitude is outside of threshold levels. On the contrary, the uniform innovation magnitude in FIG. 27b indicates there is no sensor-loss and the TM-AFM image reflects a true sample profile. Note that in the experimental result presented in FIGS. 27a and 27b, the magnitude of the innovation signal is used for detection of sensor-loss and spurious image, which is not possible using traditional imaging parameters like amplitude(A), error signal(A-$A_{setpoint}$) or vertical piezo actuation signal.

Figure 28A:
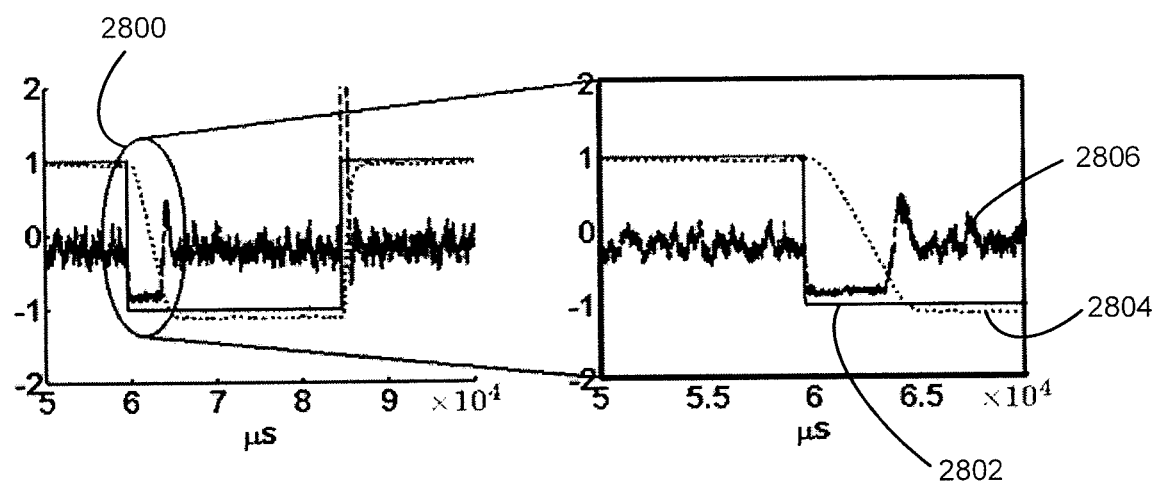
FIGS. 28a and 28b are graphs illustrating that the effect of the loss of cantilever interaction is independent of the scan rate of the atomic force microscope.
Figure 28B:
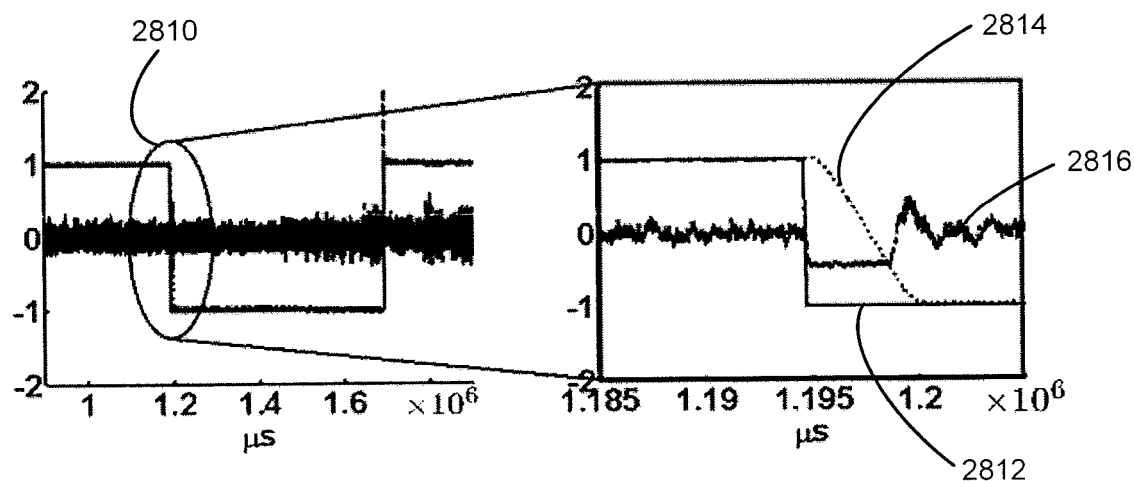
Figure 29A:
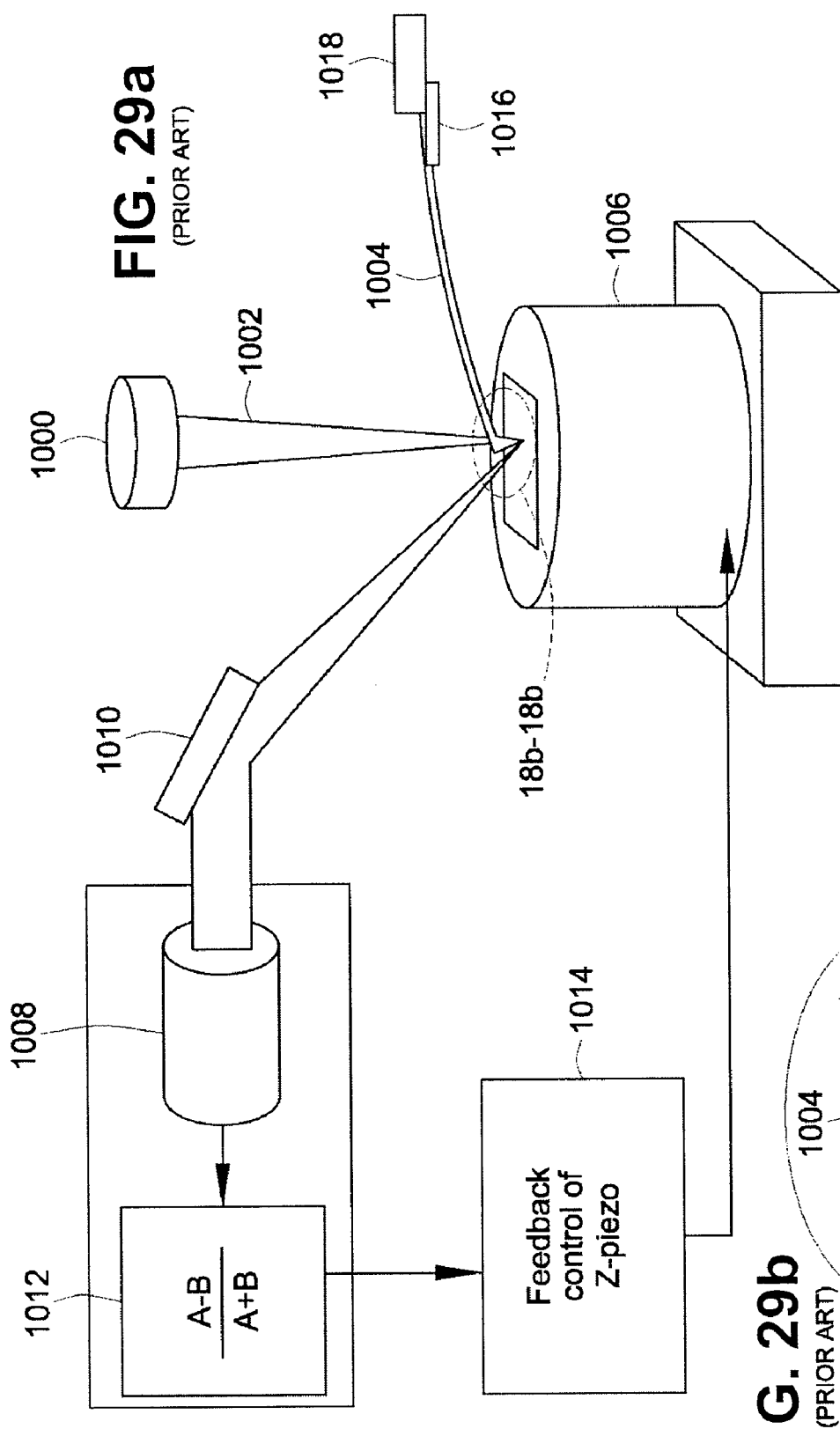
FIG. 29a is a block diagram of a prior art atomic force microscope.
Figure 29B:
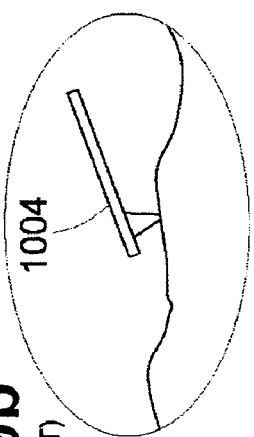
FIG. 29b is a diagram of a cantilever in contact with a sample.

It is to be noted that while in a lower scan rate, the effect of sensor-loss is not so prominent, it is present for exact same duration as for any other rate. The number of cycles of sensor-loss is determined largely by the quality factor Q of the cantilever and is independent of the scan-rate. Thus, the percentage of the region affected by sensor-loss scales proportionately with the scan-rate. This is demonstrated in FIGS. 28a and 28b, where a rectangular profile is imaged at 20 Hz (see FIG. 28a) and at 1 Hz (see FIG. 28b). At a 20 Hz scan rate, 8.9 percent of the area (indicated at 2800) contains spurious height profile as compared to 0.445% of the area (indicated at 2810) at a 1 Hz scan rate. The manufacturers of AFM's are striving to reduce device dimensions thereby increasing the operation bandwidth of the z regulation and the cantilevers. As discussed earlier, for dynamic mode operation to benefit from these increases in bandwidth, the limitation imposed by sensor-loss, that is primarily dictated by the quality factor Q, should be addressed.

From the foregoing, it can be seen that a new approach to determine cantilever movement has been described. An observer based state estimation and statistical signal detection and estimation techniques have been applied to Atomic Force Microscopes. A first mode approximation model of the cantilever is considered and a filter is designed to estimate the dynamic states. The cantilever-sample interaction is modeled as an impulsive force applied to the cantilever in order to detect the presence of sample. An estimated deflection of the cantilever is generated using a dither forcing input signal and an innovation between cantilever deflection data and the estimated deflection is generated. A detection is made when the cantilever loses interaction with the sample based upon the innovation. Utilizing the innovation, the region of sensor-loss can be identified with an asserted level of confidence. As the sensor-loss detection is done in real-time, it can be used as a signal that can be used to take corrective action to minimize the sensor-loss affected region.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to detect when a cantilever loses interaction with a sample comprising the steps of:
   receiving a dither forcing input signal and cantilever deflection data;
   generating an estimated deflection of the cantilever using the dither forcing input signal;
   generating an innovation between the cantilever deflection data and the estimated deflection; and
   detecting when the cantilever loses interaction with the sample based upon the innovation.

2. The method of claim 1 wherein the step of detecting when the cantilever loses interaction with the sample based upon the innovation includes detecting when the innovation is outside of a threshold level.

3. The method of claim 1 wherein the step of detecting when the cantilever loses interaction with the sample based upon the innovation includes detecting when a magnitude of the innovation drops such that the magnitude is below a threshold.

4. The method of claim 1 further comprising the step of adding a correction signal to the dither forcing signal such that the estimated deflection of the cantilever is generated using the dither forcing input signal and the correction signal.

5. The method of claim 1 wherein the estimated deflection is defined by the equation $$\ddot{\hat{y}} + \frac{\omega_0}{Q}\dot{\hat{y}} + \omega_0^2 \hat{y} = g(t), [\dot{\hat{y}}(0), \hat{y}(0)]$$

where g(t) is the dither forcing input signal $\hat{y}(0)$ is an estimated initial deflection of the cantilever and $\dot{\hat{y}}(0)$ is an initial velocity of the cantilever, Q is a quality factor of the cantilever, $\hat{y}$ is the estimated deflection, and $\omega_0$ is a first resonant frequency of the cantilever.

6. The method of claim 5 further comprising the step of adding a correction signal to the dither forcing signal, the correction signal defined by the equation $$(u(t) = [l_1 \ l_2]^T * [e(t)\dot{e}(t)]$$

where $[l_1 \ l_2]^T$ is the gain of the observer, e(t) is the innovation, and $\dot{e}(t)$ is a derivative of the innovation.

7. The method of claim 5 wherein the cantilever deflection data is given by $$\ddot{p} + \frac{\omega_0'}{Q'}\dot{p} + \omega_0'^2 p = g(t) + \eta(t)$$

where $\omega_0'^2 = \omega_0^2 + \frac{2}{a}\frac{1}{2\pi}\int_0^{2\pi} h(a\cos\psi, -a\omega\sin\psi)\cos\psi d\psi$, $$\frac{\omega_0'}{Q'} = \frac{\omega_0}{Q} + \left(\frac{1}{a\omega}\frac{1}{\pi}\int_0^{2\pi} h(a\cos\psi - a\omega\sin\psi)\sin\psi d\psi\right),$$

a is the steady state amplitude of the cantilever in the presence of the sample, $\omega_0$ is the first resonant frequency of the cantilever, Q is a quality factor of the cantilever, p is cantilever deflection, and $\eta(t)$ is thermal noise.

8. A method of detecting when a cantilever loses interaction with a sample in a sampling system, the method comprising the steps of:
   receiving, by an observer, a dither forcing input signal and cantilever deflection data;
   generating, by the observer, an estimated deflection of the cantilever using the dither forcing input signal;
   generating an innovation between the cantilever deflection data and the estimated deflection; and
   detecting when the cantilever oses interaction with the sample based upon the innovation.

9. The method of claim 8 wherein the step of detecting when the cantilever loses interaction with the sample based upon the innovation includes detecting when the innovation is outside of a threshold level.

10. The method of claim 8 wherein the step of detecting when the cantilever loses interaction with the sample based upon the innovation includes detecting when a magnitude of the innovation drops such that the magnitude is below a threshold.

11. The method of claim 8 further comprising the step of adding a correction signal to the dither forcing signal such that the estimated deflection of the cantilever is generated using the dither forcing input signal and the correction signal.

12. The method of claim 11 wherein the step of generating the innovation between the cantilever deflection data and the estimated deflection comprises the step of generating the innovation according to $$\ddot{e} + \frac{\omega_0}{Q}\dot{e} + \omega_0^2 e = \eta(t); [e(0), \dot{e}(0)] := \left[y(0) - \hat{y}(0), \dot{y}(0) - \dot{\hat{y}}(0)\right]$$

where $\eta(t)$ is thermal noise, $\hat{y}(0)$ is an estimated initial deflection of the cantilever, $\dot{\hat{y}}(0)$ is an estimated initial velocity of the cantilever, Q is a quality factor of the cantilever, y(0) is the deflection, $\dot{y}(0)$ is an initial velocity of the cantilever, and $\omega_0$ is a first resonant frequency of the cantilever.

13. The method of claim 8 wherein the estimated deflection is defined by the equation $$\ddot{\hat{y}} + \frac{\omega_0}{Q}\dot{\hat{y}} + \omega_0^2\hat{y} = g(t), \left[\dot{\hat{y}}(0), \hat{y}(0)\right]$$

where g(t) is the dither forcing input signal $\hat{y}(0)$ is an estimated initial deflection of the cantilever and $\dot{\hat{y}}(0)$ is an initial velocity of the cantilever, Q is a quality factor of the cantilever, $\hat{y}$ is the estimated deflection, and $\omega_0$ is a first resonant frequency of the cantilever.

14. The method of claim 13 further comprising the step of adding a correction signal to the dither forcing signal, the correction signal defined by the equation $$(u(t) = [l_1 \ l_2]^T * [e(t)\dot{e}(t)])$$

where $[l_1 \ l_2]^T$ is the gain of the observer, e(t) is the innovation, and $\dot{e}(t)$ is a derivative of the innovation.

15. The method of claim 12 wherein the cantilever deflection data is given by $$\ddot{p} + \frac{\omega_0'}{Q'}\dot{p} + \omega_0'^2 p = g(t) + \eta(t)$$

where $\omega_0'^2 = \omega_0^2 + \frac{2}{a}\frac{1}{2\pi}\int_0^{2\pi} h(a\cos\psi, -a\omega\sin\psi)\cos\psi d\psi,$ $$\frac{\omega_0'}{Q'} = \frac{\omega_0}{Q} + \left(\frac{1}{a\omega}\frac{1}{\pi}\int_0^{2\pi} h(a\cos\psi - a\omega\sin\psi)\sin\psi d\psi\right),$$

a is the steady state amplitude of the cantilever in the presence of the sample, $\omega_0$ is the first resonant frequency of the cantilever, Q is a quality factor of the cantilever, p is cantilever deflection, and $\eta(t)$ is thermal noise.

16. A method to detect when a portion of an image obtained using a cantilever is spurious, the method comprising the steps of:
receiving a dither forcing input signal and cantilever deflection data;
generating an estimated deflection of the cantilever using the dither forcing input signal;
generating an innovation between the cantilever deflection data and the estimated deflection;
detecting when image is spurious by detecting when the innovation is outside of a threshold level.

17. The method of claim 16 wherein the step of detecting when the innovation is outside of a threshold level includes detecting when a magnitude of the innovation drops such that the magnitude is below the threshold level.

18. The method of claim 16 wherein the step of generating the innovation comprises the step of generating the innovation according to $$\ddot{e} + \frac{\omega_0}{Q}\dot{e} + \omega_0^2 e = \eta(t); [e(0), \dot{e}(0)] := \left[y(0) - \hat{y}(0), \dot{y}(0) - \dot{\hat{y}}(0)\right]$$

where e(t) is the innovation, $\eta(t)$ is thermal noise, $\omega_0$ is a first resonant frequency of the cantilever, Q is a quality factor of the cantilever, $\hat{y}(0)$ is an estimated initial deflection of the cantilever, $\dot{\hat{y}}(0)$ is an estimated initial velocity of the cantilever, y(0) is the deflection, and $\dot{y}(0)$ is an initial velocity of the cantilever.

19. The method of claim 16 wherein the step of generating the innovation comprises the step of generating the innovation according to $$\ddot{e} + \frac{\omega_0}{Q}\dot{e} + \omega_0^2 e = \eta(t); [e(0), \dot{e}(0)] := \left[y(0) - \hat{y}(0), \dot{y}(0) - \dot{\hat{y}}(0)\right]$$

where $\eta(t)$ is thermal noise, $\hat{y}(0)$ is an estimated initial deflection of the cantilever, $\dot{\hat{y}}(0)$ is an estimated initial velocity of the cantilever, Q is a quality factor of the cantilever, y(0) is the deflection, $\dot{y}(0)$ is an initial velocity of the cantilever, and $\omega_0$ is a first resonant frequency of the cantilever.

* * * * *